(12) United States Patent
Yamamoto et al.

(10) Patent No.: US 10,622,685 B2
(45) Date of Patent: Apr. 14, 2020

(54) PROBLEM DETECTION APPARATUS

(71) Applicant: FUJITSU TEN LIMITED, Kobe-shi, Hyogo (JP)

(72) Inventors: Haruhiro Yamamoto, Kobe (JP); Yohei Terada, Kobe (JP)

(73) Assignee: FUJITSU TEN Limited, Kobe (JP)

( * ) Notice: Subject to any disclaimer, the term of this patent is extended or adjusted under 35 U.S.C. 154(b) by 546 days.

(21) Appl. No.: 15/492,231

(22) Filed: Apr. 20, 2017

(65) Prior Publication Data
US 2018/0006340 A1    Jan. 4, 2018

(30) Foreign Application Priority Data

Jul. 4, 2016 (JP) .................................. 2016-132434

(51) Int. Cl.
*G01R 31/08*     (2020.01)
*H01M 10/48*     (2006.01)
*B60L 3/00*      (2019.01)
*B60L 58/21*     (2019.01)
(Continued)

(52) U.S. Cl.
CPC ......... *H01M 10/482* (2013.01); *B60L 3/0084* (2013.01); *B60L 58/21* (2019.02); *H01M 10/425* (2013.01); *H02H 1/0007* (2013.01); *B60L 2240/547* (2013.01); *B60L 2250/10* (2013.01); *H01M 2010/4271* (2013.01); *Y02T 10/7005* (2013.01); *Y02T 10/7061* (2013.01)

(58) Field of Classification Search
CPC .. G01R 31/024; G01R 31/025; G01R 31/026; G01R 31/2607; G01R 31/327; G01R 31/3275; G01R 31/3277; G01R 31/3278; G01R 31/3696; G01R 31/362; G01R 19/165; G01R 31/16504; G01R 31/16571; G01R 31/16542
See application file for complete search history.

(56) References Cited

U.S. PATENT DOCUMENTS 7,843,706 B2 * 11/2010 Suzuki .................... H02M 1/36
                                              363/16
8,278,882 B2 * 10/2012 Gotou .................... B60L 53/30
                                              320/163
(Continued)

FOREIGN PATENT DOCUMENTS

JP       2013-188068 A     9/2013
JP       2013188068    *   9/2013

*Primary Examiner* — Thang X Le
(74) *Attorney, Agent, or Firm* — Oliff PLC

(57) ABSTRACT

A problem detection apparatus includes a relay, a measurement circuit and a controller. The relay is provided between a power supply and an external circuit, both of which are in a high voltage system. The relay is configured to switch an electrical connection state of the power supply to the external circuit between a closed state and an open state. The measurement circuit measures a voltage of a circuit in the high voltage system. The measurement circuit is in the high voltage system and connected between the relay and the external circuit. In a case where a command to switch the relay to the open state has been output, the controller detects, based on the voltage measured by the measurement circuit, whether or not the relay has a short circuit. The controller is in a low voltage system having a lower voltage than a voltage of the high voltage system.

10 Claims, 14 Drawing Sheets

(51) Int. Cl.
  *H01M 10/42*    (2006.01)
  *H02H 1/00*     (2006.01)

(56) References Cited

U.S. PATENT DOCUMENTS

| | | | | |
|---|---|---|---|---|
| 2009/0091332 A1* | 4/2009 | Emori | ................... | H02J 7/0019 |
| | | | | 324/537 |
| 2012/0161681 A1* | 6/2012 | Kuroda | ................ | B62D 5/0481 |
| | | | | 318/400.21 |
| 2013/0268158 A1* | 10/2013 | Kurita | ....................... | B60L 3/00 |
| | | | | 701/32.8 |
| 2014/0327431 A1* | 11/2014 | Nakamura | ......... | G01R 19/0084 |
| | | | | 324/130 |
| 2015/0035539 A1* | 2/2015 | Wakida | ................ | G01R 31/327 |
| | | | | 324/418 |
| 2015/0107934 A1* | 4/2015 | Morino | ................ | B62D 5/0487 |
| | | | | 180/407 |
| 2018/0131178 A1* | 5/2018 | Shimomura | ........... | H02H 3/044 |

* cited by examiner

PROBLEM DETECTION APPARATUS

BACKGROUND OF THE INVENTION

Field of the Invention

The invention relates to a technology that detects a problem.

Description of the Background Art

Conventionally, a technology has been known that detects a short circuit in a relay provided between a battery apparatus and an external power supply, using a voltage sensor provided between the external power supply and the relay (e.g., Japanese Patent Application Laid-open Publication No. 2013-188068).

However, the reference cited above does not describe in detail the voltage sensor that detects the short circuit of the relay.

One thinkable example is a method of detecting the short circuit of the relay based on a measured voltage measured by a measuring part of a low voltage system insulated from a high voltage system by a flying capacitor that is connected between the relay and the external power supply in the high voltage system.

However, a component that is used for a circuit for the flying capacity is so expensive that the component increases a cost of a problem detection apparatus that detects the short circuit of the relay.

SUMMARY OF THE INVENTION

According to one aspect of the invention, a problem detection apparatus includes a relay, a measurement circuit and a controller. A relay is provided between a power supply and an external circuit; both of which are in a high voltage system. The relay is configured to switch an electrical connection state of the power supply to the external circuit between a closed state and an open state. The measurement circuit measures a voltage of a circuit in the high voltage system. The measurement circuit is in the high voltage system and is connected between the relay and the external circuit. The controller detects, based on the voltage measured by the measurement circuit, whether or not the relay has a short circuit, in a case where a command to switch the relay to the open state has been output. The controller is in a low voltage system having a lower voltage than a voltage of the high voltage system.

Thus, cost can be reduced, and it is possible to detect whether or not the relay has the short circuit.

According to another aspect of the invention, the relay includes: a first relay that is provided between a positive electrode of the power supply and the external circuit; and a second relay that is provided between a negative electrode of the power supply and the external circuit. The circuit in the high voltage system includes: a first circuit that is connected between the first relay and the external circuit; and a second circuit that is connected between the second relay and the external circuit. The measurement circuit measures a voltage of the first circuit and a voltage of the second circuit. The controller detects: whether or not the first relay has a short circuit, based on the voltage of the first Circuit measured by the measurement circuit, in a case where the command to switch the first relay to the open state has been output; and whether or not the second relay has a short circuit, based on the voltage of the second circuit measured by the measurement circuit, in a case where the command to switch the second relay to the open state has been output.

Thus, in the case where the first relay or the second relay has the short circuit, it is possible to detect the short circuit early.

Thus, an object of the invention provides a problem detection technology that detects whether or not a relay has a short circuit at a lower cost.

These and other objects, features, aspects and advantages of the invention will become more apparent from the following detailed description of the invention when taken in conjunction with the accompanying drawings.

DESCRIPTION OF THE EMBODIMENTS

A problem detection apparatus and an assembled battery system of an embodiment disclosed by the present application will be described below with reference to the attached drawings. This invention is not limited by this embodiment described below.

<Outline of Assembled Battery System 100>

Figure 1:
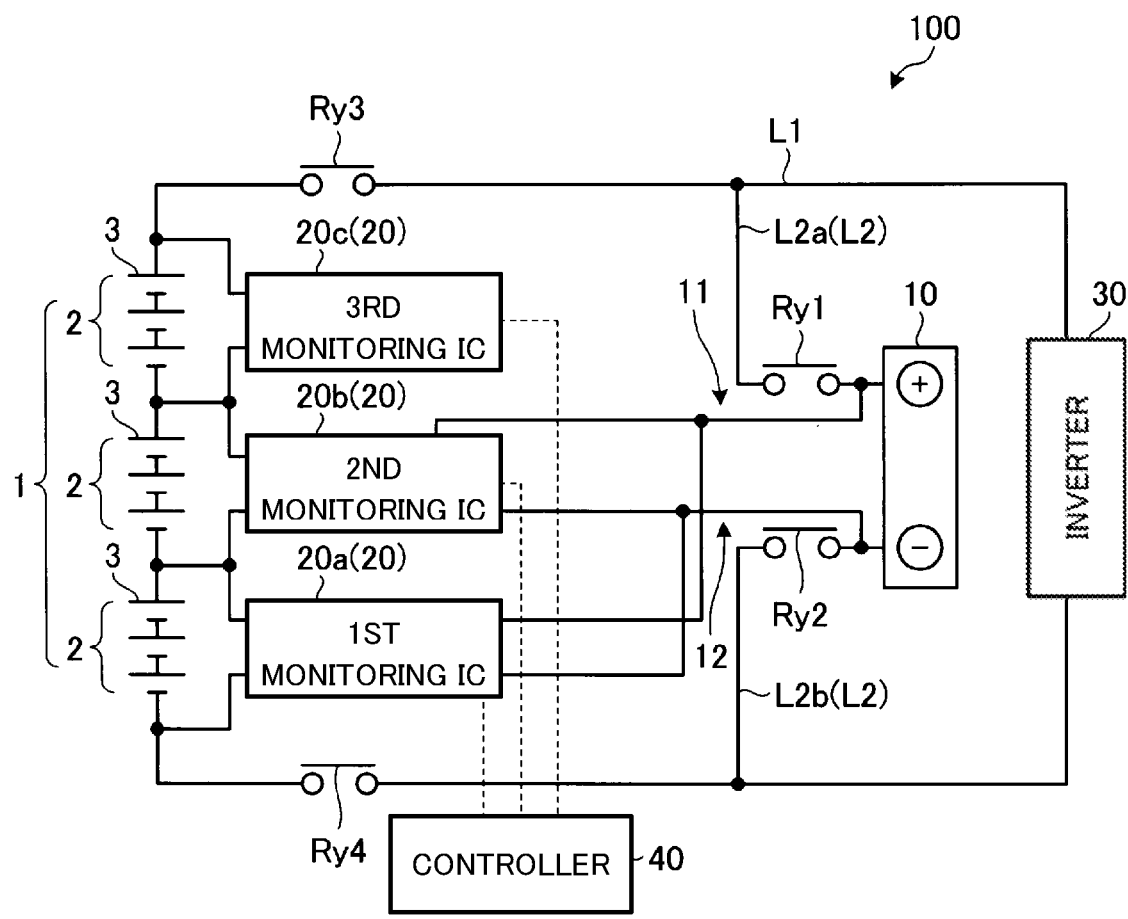
FIG. 1 illustrates an example of a configuration of an assembled battery system of this embodiment.

FIG. 1 illustrates an example of a configuration of an assembled battery system 100 of the embodiment. The assembled battery system 100 shown in FIG. 1 includes an assembled battery 1, a charging inlet 10, a monitoring integrated circuit (IC) 20, an inverter 30 and a controller 40.

The assembled battery 1 is configured with plural cell stacks 2 connected in series via a connection member (not illustrated). Each of the plural cell stacks 2 is configured with plural battery cells 3 connected in series. In an example shown in FIG. 1, each of three cell stacks 2 connected in series via the connection members includes three battery cells 3 connected in series. However, the configuration is not limited to this. The assembled battery 1 is connected to the inverter 30 via a connection line L1, and supplies power to a load, such as a motor generator (not illustrated) via the inverter 30. Moreover, the assembled battery 1 is supplied with power from, for example, the motor generator, via the inverter 30, and is charged. The assembled battery 1 is connected to the charging inlet 10 via a charging line L2 branched from the connection line L1, and is supplied and charged with power from an external power supply (not illustrated).

A lithium-ion secondary battery and a nickel-metal hydride battery are among examples of the assembled battery 1. However, the assembled battery 1 is not limited to those batteries.

The charging-line L2 includes: a first charging line L2a that can electrically connect positive terminal of the assembled battery 1 to a positive electrode of the charging inlet 10 via the connection line L1; and a second charging line L2b that can care electrically connect a negative terminal of the assembled battery 1 to a negative electrode of the charging inlet 10 via the connection line L1.

A first charging inlet relay Ry1 is provided to the first charging line L2a. Once the first charging inlet relay Ry1 is caused to be in an ON-state, the positive terminal of the assembled battery 1 is electrically connected to the positive electrode of the charging inlet 10. Once the first charging inlet relay Ry1 is caused to be in an OFF-state, the positive terminal of the assembled battery 1 is electrically disconnected from the positive electrode of the charging inlet 10.

A second charging inlet relay Ry2 is provided to the second charging line L2b. Once the second charging inlet relay Ry2 is caused to be in the ON-state, the negative terminal of the assembled battery 1 is electrically connected to the negative electrode of the charging inlet 10. Once the second charging inlet relay Ry2 is caused to be in the OFF-state, the negative terminal of the assembled battery 1 is electrically disconnected from the negative electrode of the charging inlet 10.

The connection line L1 includes a first main relay Ry3 that is provided between the positive terminal of the assembled battery 1 and a branching point from which the first charging line L2a is branched. Moreover, the connection line L1 includes a second main relay Ry4 that is provided between the negative terminal of the assembled battery 1 and a branching point from which the second charging line L2b is branched. Once the first main relay Ry3 and the second main relay Ry4 are caused to be in the ON-state, the assembled battery 1 is electrically connected to the inverter 30. Once the first main relay Ry3 or the second main relay Ry4 is caused to be in the OFF-state, the assembled battery 1 is electrically disconnected from the inverter 30.

The monitoring IC 20 is provided to each cell stack 2. In an example shown in FIG. 1, the assembled battery system 100 includes a first monitoring IC 20a, a second monitoring IC 20b and a third monitoring IC 20c. Each of the monitoring ICs 20a to 20c measures a voltage of each battery cell 3 and a voltage of each cell stack 2.

Moreover, each of the first monitoring IC 20a and the second monitoring IC 20b measures a voltage of a positive side monitoring circuit 11 that is connected between the first charging inlet relay Ry1 and the positive electrode of the charging inlet 10. Each of the first monitoring IC 20a and the second monitoring IC 20b measures a voltage of a negative side monitoring circuit 12 that is connected between the second charging inlet relay Ry2 and the negative electrode of the charging inlet 10.

Each of the monitoring ICs 20a to 20c outputs a signal indicative of the measured voltage, to the controller 40. Each of the monitoring ICs 20a to 20c includes plural input-output terminals. For example, the input-output terminals of the first monitoring IC 20a and the second monitoring IC 20b are connected to the battery cells 3, the positive side monitoring circuit 11 and the negative side monitoring circuit 12. Thus, the first monitoring IC 20a and the second monitoring IC 20b are configured to measure the voltage of each battery cell 3, the positive side monitoring circuit 11 and the negative side monitoring circuit 12. The monitoring ICs 20a to 20c are included in a high voltage system that is applied with the voltage of the battery cell 3, a voltage of the charging inlet 10, etc. Each of the monitoring ICs 20a to 20c sends the signal indicative of the measured voltage, to the controller 40.

The controller 40 switches each of the relays Ry1 to Ry4 between the ON-state and the OFF-state. Moreover, the controller 40 switches each of diagnosis switches SW1 to SW3 (refer to FIG. 2), described later, between the ON-state and the OFF-state. The controller 40 detects, based on the signals indicative of the voltage sent from the first monitoring IC 20a and the second monitoring IC 20b, an operation problem of the first charging inlet relay Ry1 and the second charging inlet relay Ry2, such as a short circuit caused by the first charging inlet relay Ry1 welded in the ON-state and by the second charging inlet relay Ry2 welded in the ON state. The controller 40 performs a failure diagnosis for the positive side monitoring circuit 11 and the negative side monitoring circuit 12, based on the signals indicative of the voltages sent from the first monitoring IC 20a and the second monitoring IC 20b. The controller 40 is included in a low-voltage system in which the voltage is lower than a voltage of the monitoring IC 20.

In the assembled battery system 100 of the embodiment, the voltages of the monitoring circuits 11 and 12 are measured by using the first monitoring IC 20a and the second monitoring IC 20b in the high voltage system. Then, in the low voltage system of which voltage is lower than the monitoring ICs 20a to 20c, the controller 40 detects a short circuit of the first charging inlet relay Ry1 or of the second charging inlet relay Ry2, and performs the failure diagnosis based on the signal indicative of the voltage sent from the monitoring IC 20.

<Configuration of Monitoring Circuit>

Figure 2:
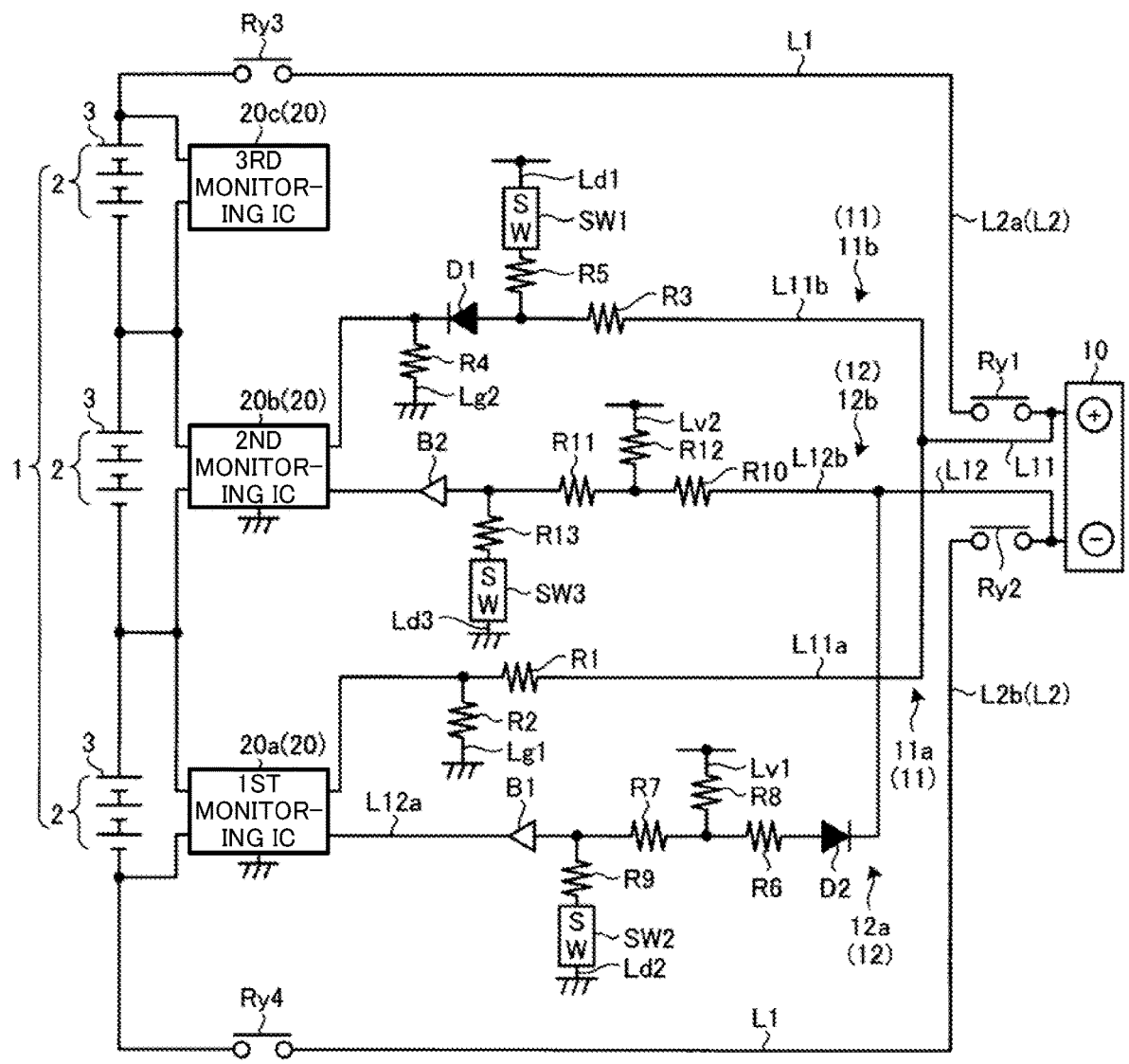
FIG. 2 illustrates a positive side monitoring circuit d a negative side monitoring circuit.

Next, the positive side Monitoring circuit 11 and the negative side monitoring circuit 12 will be described with reference to FIG. 2. FIG. 2 illustrates the positive side monitoring circuit 11 and the negative side monitoring circuit 12. The inverter 30 and a portion of the connection line L1 are omitted from FIG. 2, and also from subsequent drawings.

The positive side monitoring circuit 11 is configured with a first positive side monitoring circuit 11a and a second positive side monitoring circuit 11b.

The first positive side monitoring circuit 11a includes a first common line L11 and a first positive side monitoring line L11a. The first common line L11 is connected to the first charging line L2a provided between the first charging inlet relay Ry1 and the positive electrode of the charging inlet 10, and the first positive side monitoring line L11a is branched from the first common line L11 and is connected to the first monitoring IC 20a.

The second positive side monitoring circuit 11b includes the first common line L11 and a second positive side monitoring line L11b branched from the first common line L11 and connected to the second monitoring IC 20b.

A resistor R1 is provided to the first positive side monitoring line L11a. A first grounding conductor Lg1 including a resistor R2 is connected between the resistor R1 and the first monitoring IC 20a of the first positive side monitoring line L11a.

The resistor R1 and the resistor R2 restrict (adjust) a current flowing to the first monitoring IC 20a in the first positive side monitoring line L11a. A resistance value of the resistor R1 and a resistance value of the resistor R2 are set such that the first monitoring IC 20a can measure a voltage of the first positive side monitoring line L11a in a case where the first charging inlet relay Ry1 has a short circuit. The resistor R1 is configured with a plurality of resistors, having a small resistance value, connected in series. Thus, it is easier to ensure an insulation distance.

In order of being closer to the first common line L11, a resistor R3 and a diode D1 are provided to the second positive side monitoring line L11b. The second positive side monitoring line L11b is connected to a second grounding conductor Lg2 including a resistor R4 between the diode D1 and the second monitoring IC 20b. Moreover, a first diagnosis line Ld1 including a first diagnosis switch SW1 and a resistor R5 is connected between the resistor R3 and the diode D1 of the second positive side monitoring line L11b.

The diode D1 allows the current only to flow from the first common line L11 to the second monitoring IC 20b, and prevents the current from flowing in an opposite direction.

The resistor R3 and the resistor R4 restrict (adjust) the current flow to the second monitoring IC 20b in the second positive side monitoring line L11b. A resistance value of the resistor R3 and a resistance value of the resistor R4 are set such that the second monitoring IC 20b can measure a voltage of the second positive side monitoring line L11b in the case Where the first charging inlet relay Ry1 has a short-circuit. The resistor R3 is configured with a plurality of resistors, having a small resistance value, connected in series. Thus, it is easier to ensure an insulation distance. The resistor R5 restricts (adjusts) the current flowing to the second monitoring IC 20b at a time of a positive side monitoring circuit failure diagnosis.

The first diagnosis switch SW1 is caused to be in the ON-state in a case where the positive side monitoring circuit failure diagnosis, described later in detail, is performed, and is caused to be in the OFF-state in other cases.

The negative side monitoring circuit 12 is configured with a first negative side monitoring circuit 12a and a second negative side monitoring circuit 12b The first negative side monitoring circuit 12a includes a second common line L12 and a first negative side monitoring line L12a. The second common line L12 is connected to the second charging line L2b provided between the second charging inlet relay Ry2 and the negative electrode of the charging inlet 10, and the first negative side monitoring line L12a is branched from the second common line L12 and is connected to the first monitoring IC 20a.

The second negative side monitoring circuit 12b includes the second common line L12 and a second negative side monitoring line L12b branched from the second common line L12 and connected to the second monitoring IC 20b.

In order of being closer to the second common line L12, a diode D2, a resistor R6, a resistor R7 and a buffer B1 are provided to the first negative side monitoring line L12a. A first voltage line Lv1 that increases a voltage of the first negative side monitoring line L12a is provided between the resistor R6 and the resistor R7 of the first negative side monitoring line L12a. A resistor R8 is provided to the first voltage line Lv1. The first voltage line Lv1 is applied with, for example, an internal voltage of the first monitoring IC 20a. Moreover, a second diagnosis line Ld2 is connected between the resistor R7 and the buffer B1 of the first negative side monitoring line L12a. The second diagnosis switch SW2 and a resistor R9 are provided to the second diagnosis line Ld2.

The diode D2 allows the current only to flow from the resistor R6 to the second common line L12, and prevents the current from flowing in an opposite direction.

The resistor R7 and the resistor R8 restrict (adjust) the current flowing to the first negative side monitoring line L12a. A resistance value of the resistor R7 and a resistance value of the resistor R8 are set such that the first monitoring IC 20a can measure a voltage of the first negative side monitoring line L12a. The resistance value of the resistor R7 is greater than the resistance value of the resistor R6, and is, for example, approx. 50 times greater than the resistance value of the resistor R6. In a case where the negative side monitoring circuit 12 has a failure, the resistor R9 maintains the voltage of the first negative side monitoring line L12a. For example, the resistance value of the resistor R9 is an almost same level as the resistance value of the resistor R7.

The buffer B1 prevents the voltage that is measured by the first monitoring IC 20a from decreasing due to a leakage current and the like of the first monitoring IC 20a and, controls fluctuations in voltage measured by the first monitoring IC 20a.

The second diagnosis switch SW2 is caused to be, in the ON-state in a case where a, negative side monitoring circuit failure diagnosis, described later in detail, is performed, and is caused to be in the OFF-state in other cases.

In order of being closer to the second common line L12, a resistor R10, a resistor R11 and a buffer B2 are provided to the second negative side monitoring line L12b. A second voltage line Lv2 that increases a voltage of the second negative side monitoring line L12b is connected between the resistor R10 and the resistor R11 of the second negative side monitoring line L12b. A resistor R12 is provided to the second voltage line Lv2. The second voltage line Lv2 is applied with, for example, an internal voltage of the second monitoring IC 20b. Moreover, a third diagnosis line Ld3 including a third diagnosis switch SW3 and a resistor R13 is connected to the second negative side monitoring line L12b.

The resistor R10 restricts (adjusts) the current flowing in the second negative side monitoring line L12b. A resistance value of the resistor R10 is greater than the resistance value of the resistor R6, and is smaller than a resistance value of the resistor R11. The resistor R11 restricts (adjusts) the current flowing to the second monitoring IC 20b. The resistance value of the resistor R11 is an almost same level as the resistance value of the resistor R7. The resistor R12 restricts (adjusts) the current flowing to the second negative side monitoring line L12b. A resistance value of the resistor R12 is smaller than the resistance value of the resistor R10. In a case where the negative side monitoring circuit 12 has a failure, the resistor R13 maintains the voltage of the second negative side monitoring line L12b. For example, a resistance value of the resistor R13 is an almost same level as the resistance value of the resistor R11.

The buffer B2 prevents the voltage that is measured by the second monitoring IC 20b from decreasing due to a leakage current and the like of the second monitoring IC 20b, and controls fluctuations in voltage measured by the second monitoring IC 20b.

The third diagnosis switch SW3 is caused to be in the ON-state in a case where the negative side monitoring circuit failure diagnosis is performed, and is caused to be in the OFF-state in other cases.

<Configuration of the Monitoring IC 20>

Figure 3:
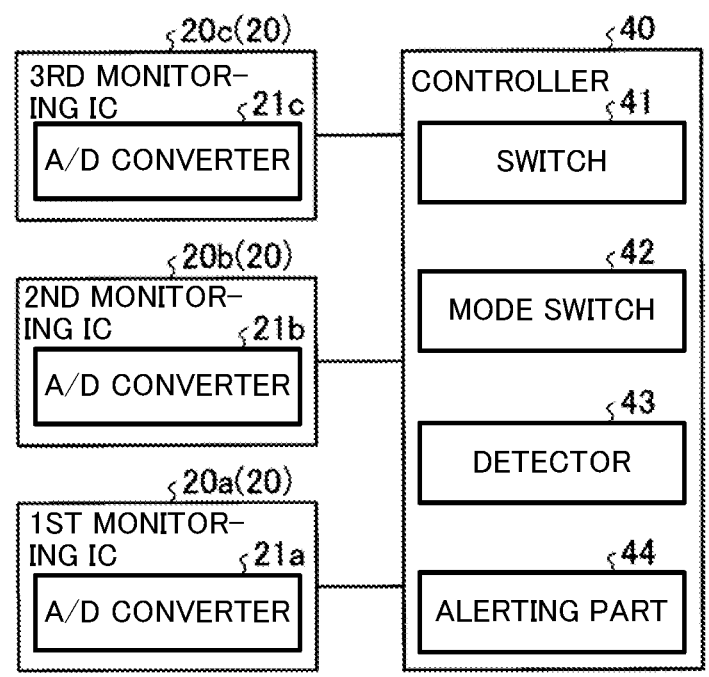
FIG. 3 is a block diagram showing a configuration of a monitoring IC and a configuration of a controller.

Next, the monitoring IC 20 will be described with reference to FIG. 3. FIG. 3 is a block diagram Showing a configuration of the monitoring IC 20 and a configuration of the controller 40.

The first monitoring IC 20a includes an A/D converter 21a. The A/D converter 21a measures a voltage of each battery cell 3 of the cell stack 2, a voltage V1 of the first positive side monitoring line L11a and a voltage V3 of the first negative side monitoring line L12a. The A/D converter 21a then converts the measured analogue voltage values to digital voltage values, and outputs the converted signal to the controller 40.

The second monitoring IC 20b includes an A/D converter 21b. The A/D converter 21b measures a voltage of each battery cell 3 of the cell stack 2, a voltage V2 of the second positive side monitoring line L11b and a voltage V4 of the second negative side monitoring line L12b. The A/D converter 21b then converts the measured analogue voltage values to digital voltage values, and then outputs the converted signal to the controller 40.

The third monitoring IC 20c includes an A/D converter 21c. The A/D converter 21c measures a voltage of each battery cell 3 of the cell stack 2. The A/D converter 21c then converts the measured analogue voltage values to digital voltage values, and then outputs the converted signal to the controller 40.

The first monitoring IC 20a and the second monitoring IC 20b change a path for measuring the voltage based on a signal from a mode switch 42 of the controller 40.

<Configuration of the Controller 40>

Next, the controller 40 will be described. The controller 40 includes a switch 41 and the mode switch 42, a detector 43 and an alerting part 44.

The switch 41 outputs a command signal indicative of switching each of the relays Ry1 to Ry4 and the diagnosis switches SW1 to SW3 between the ON-state and the OFF-state.

The mode switch 42 changes a measurement mode to one of a normal measurement mode, a relay short-circuit measurement mode and a failure diagnosis mode, to set the path for each of the monitoring ICs 20a to 20c to measure the voltage.

The normal measurement mode causes each of the monitoring ICs 20a to 20c to measure a voltage of each battery cell 3. In the normal measurement mode, for example, the voltages of the battery cells 3 are measured regardless of the ON-state or the OFF-state of each of the relays Ry1 to Ry4. In the normal measurement mode, the voltages of the battery cells 3 are measured at a predetermined interval set beforehand.

The relay short-circuit measurement mode is for determining Whether or not the first charging inlet relay Ry1 or the second charging inlet relay Ry2 has a short circuit. In the relay short-circuit measurement mode, the voltage V1 of the first positive side monitoring line L11a and the voltage V3 of the first negative side monitoring e L12a are measured by the first monitoring IC 20a, and the voltage V2 of the second positive side monitoring line L11b and the voltage V4 of the second negative side monitoring line L12b are measured by the second monitoring IC 20b. In the relay short-circuit measurement mode, the switch 41 outputs a command signal to switch the first main relay Ry3 and the second main relay Ry4 to be in the ON-state. In other words, the signal is output by the switch 41 to close the first main relay Ry3 and the second main relay Ry4. Moreover, the switch 41 outputs a command signal to switch the first charging inlet relay Ry1, the second charging inlet relay Ry2 and the diagnosis switches SW1 to SW3 to be in the OFF-state. In other words, an opening signal is output by the switch 41 to open the first charging inlet relay Ry1, the second charging inlet relay Ry2 and the diagnosis switches SW1 to SW3.

The failure diagnosis mode is for determining whether or not the resistor R1 and the like provided to the first positive side monitoring line L11a has a failure. In the failure diagnosis mode, the voltage V1 of the first positive side monitoring line L11a and the voltage V3 of the first negative side monitoring line L12a are measured by the first monitoring IC 20a; and the voltage V2 of the second positive side monitoring line L11b and the voltage V4 of the second negative side monitoring line L12b are measured by the second monitoring IC 20b. In the failure diagnosis mode, the switch 41 outputs an opening signal to cause the first main relay Ry3, the second main relay Ry4, the first charging inlet relay Ry1 and the second charging inlet relay Ry2 to be in the OFF-state. Moreover, a connection signal is output by the switch 41 to cause the diagnosis switches SW1 to SW3 to be in the ON-state.

The mode switch 42 switches the measurement mode from the normal measurement mode to the failure diagnosis mode and then to the relay short-circuit measurement mode, at a predetermined timing. In a case where, for example, the assembled battery 1 is connected to the charging inlet 10 to charge the assembled battery 1 via the charging inlet 10, the mode switch 42 changes the measurement mode from the normal measurement mode to the failure diagnosis mode. Then, in a case where the positive side monitoring circuit 11 and the negative side monitoring circuit 12 have been determined to have no failure by the failure diagnosis performed by the detector 43, the mode switch 42 changes the measurement mode to the relay short-circuit measurement mode.

The predetermined timing is not limited to the case described above. For example, in a case where the first charging inlet relay Ry1 and the second charging inlet relay Ry2 are in the OFF-state, the measurement mode may be changed to the failure diagnosis mode at predetermined intervals. Moreover, for example, the measurement mode may be changed to the failure diagnosis mode when the assembled battery system 100 is activated.

The detector 43 detects, based on the signal relating to the voltage output from the AD converters 21a and 21b, whether or not the first charging inlet relay Ry1 has a short circuit and whether or not the second charging inlet relay Ry2 has a short circuit. Moreover, the detector 43 performs the failure diagnosis, based on the signal relating to the voltage output from the A/D converters 21a and 21b, for the positive side monitoring circuit 11 and the negative side monitoring circuit 12.

In a case where the first charging inlet relay Ry1 has the short circuit, in a case where the second charging inlet relay Ry2 has the short circuit, in a case where the positive side monitoring circuit 11 has a failure or in a case where the negative side monitoring circuit 12 has a failure, the alerting part 44 issues an alert about the short circuit or the failure. For example, the alerting part 44 turns on a warning light, or prohibits the assembled battery 1 from being charged via the charging inlet 10.

The controller 40 is configured with a central processing unit (CPU), a read only memory (ROM), a random access memory (RAM) and the like. Functions of the controller 40 are implemented by the CPU reading out a stored computer readable program. Moreover, the controller 40 may be configured with a plurality of the controllers.

<Short Circuit Detection for the First Charging Inlet Relay Ry1>

Figure 4:
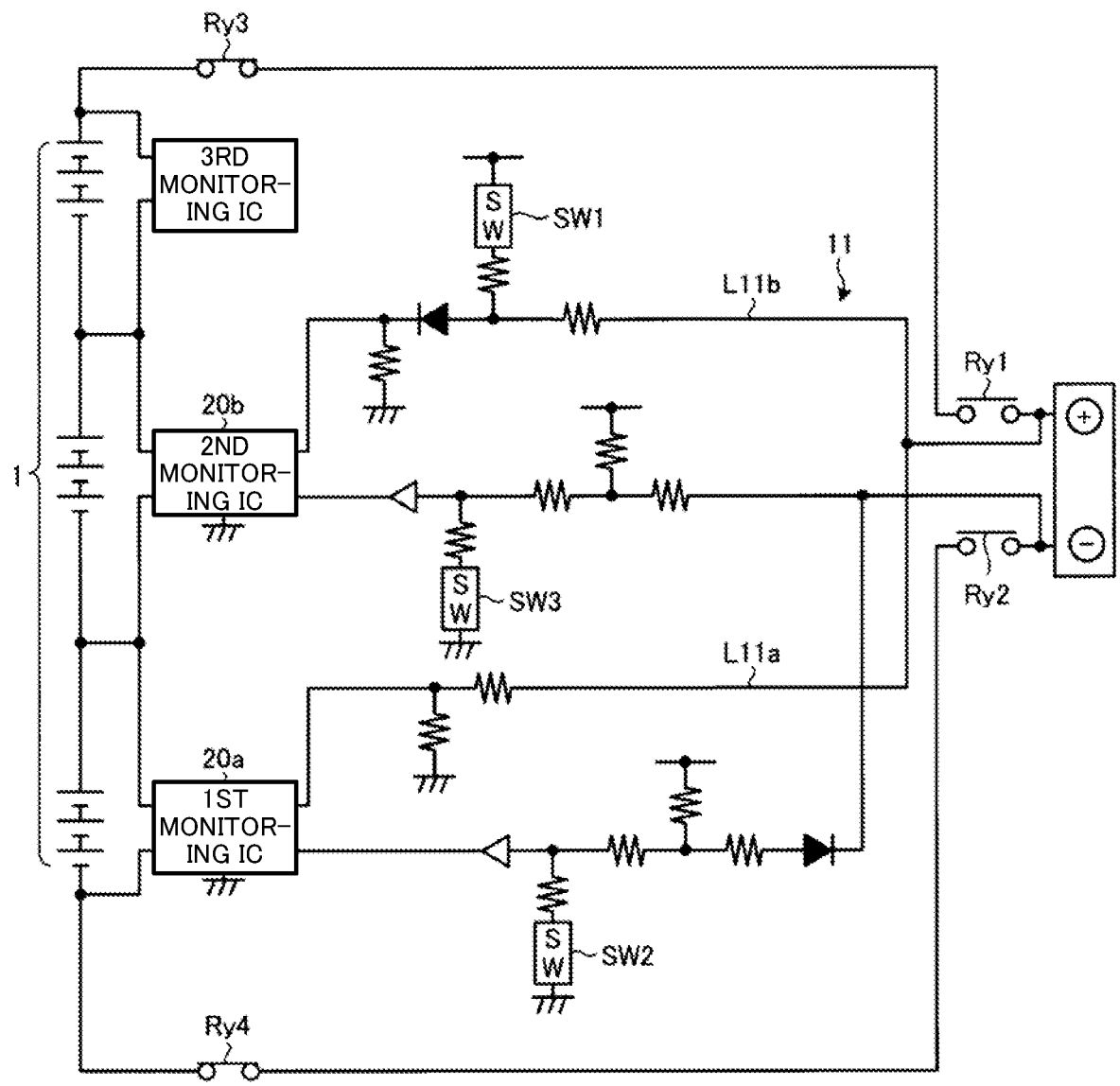
FIG. 4 illustrates a state in which a first charging inlet relay has no short circuit.
Figure 5:
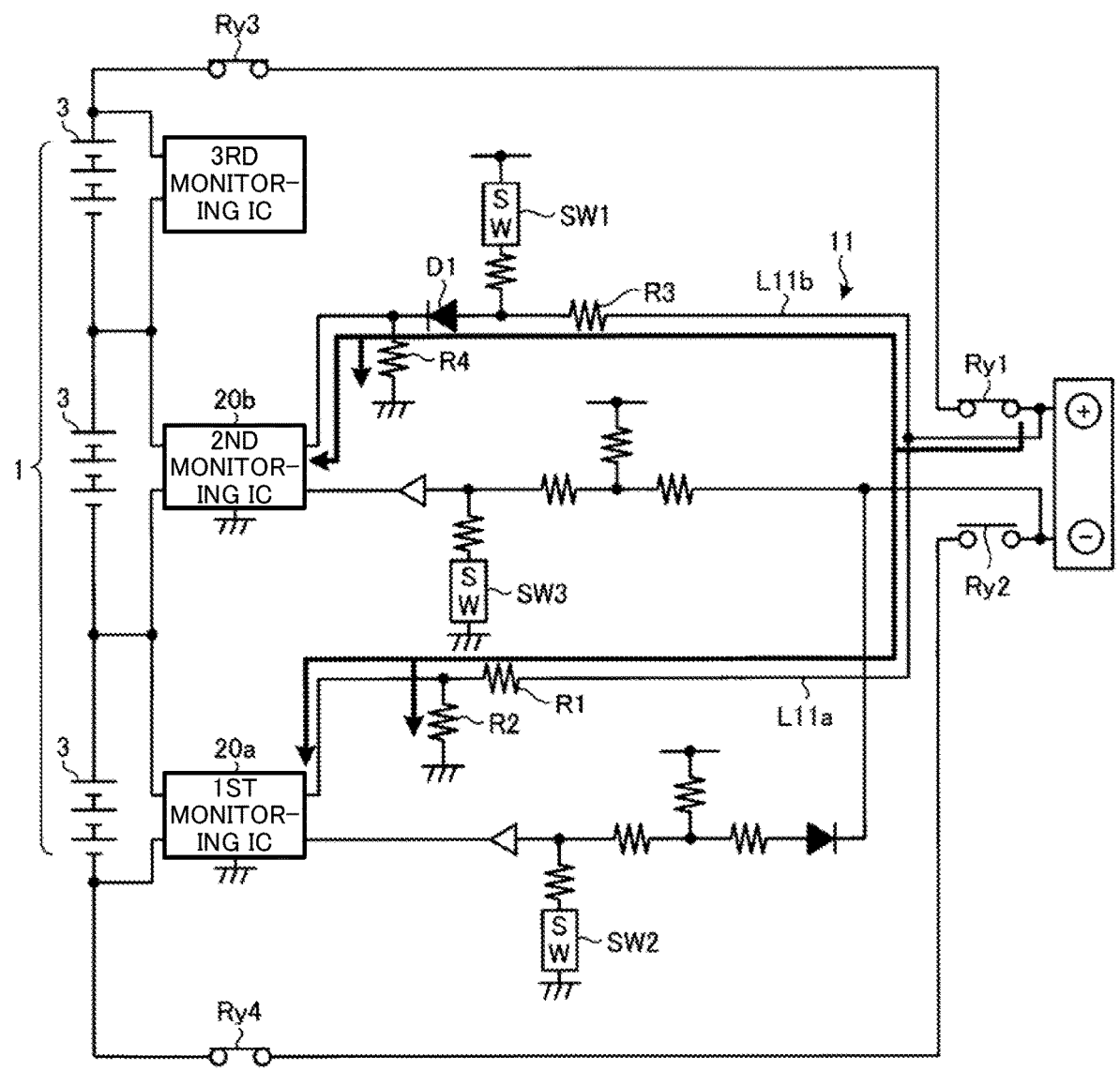
FIG. 5 illustrates a state in which the first charging inlet relay has a short circuit.

Next, detection of whether or not the first charging inlet relay Ry1 has a short circuit will be described with reference to FIGS. 4 and 5. FIG. 4 illustrates a state in which the first charging inlet relay Ry1 has no short circuit. FIG. 5 illustrates a state in which the first charging inlet relay Ry1 has a short circuit.

Once the measurement mode is set to the relay short-circuit measurement mode, the switch 41 (refer to FIG. 3) controls the relays Ry1 to Ry4 and the diagnosis switches SW1 to SW3 to cause the first main relay Ry3 and the second main relay Ry4 to be in the ON-state and to cause the first charging inlet relay Ry1, the second charging inlet relay Ry2 and the diagnosis switches SW1 to SW3 to be in the OFF-state.

In a case where the first charging inlet relay Ry1 has no short circuit, since the assembled battery 1 is electrically disconnected from the positive side monitoring circuit 11 by the first charging inlet relay Ry1 as shown in FIG. 4, the current does not flow to the positive side monitoring circuit 11. Therefore, the voltage V1 of the first positive side monitoring line L11a that is measured by the first monitoring IC 20a and the voltage V2 of the second positive side monitoring line L11b that is measured by the second monitoring IC 20b are 0 (zero) V.

On the other hand, in a case where the first charging inlet relay Ry1 has the short circuit, the assembled battery 1 is electrically connected to the positive side monitoring circuit 11 by the first charging inlet relay Ry1 as shown in FIG. 5. A flow of the current in the positive side monitoring circuit 11 is shows by a bold arrow line in FIG. 5. The flow of the current will be shown by an arrow line in each of FIG. 6 to 9.

The first monitoring IC 20a measures the voltage V1 of the first positive side monitoring line L11a. Here, the voltage V1 is measured according to a voltage of the assembled battery 1, the resistance value of the resistor R1 and the resistance value of the resistor R2.

The second monitoring IC 20b measures the voltage V2 of the second positive side monitoring line L11b. Here, the voltage V2 is measured according to the voltage of the assembled battery 1, the resistance value of the resistor R3 and the resistance value of the resistor R4. The second monitoring IC 20b is connected to the first monitoring IC 20a in series. Since a reference potential of the second monitoring IC 20b is higher by a difference in potentials between the second monitoring IC 20b and the first monitoring IC 20a, the second monitoring IC 20b adjusts the difference in the potentials between the monitoring ICs 20a and 20b, and measures the voltage V2 of the second positive side monitoring line L11b.

The diode D1 is provided to the second positive side monitoring line L11b. Thus, it is possible to prevent a current from flowing from the second monitoring IC 20b having the higher reference potential to the first monitoring IC 20a having the lower reference potential.

The signals relating to the voltage V1 and the voltage V2 measured by the first monitoring IC 20a and the second monitoring IC 20b, respectively, are sent to the detector 43 (refer to FIG. 3). In a case where the voltage V1 of the first positive side monitoring line L11a is equal to or greater than a first predetermined voltage, the detector 43 determines that the first charging inlet relay Ry1 has a short circuit. Moreover, in a case where the voltage V2 of the second positive side monitoring line L11b is equal to or greater than a second predetermined voltage, the detector 43 determines that the first charging inlet relay Ry1 has a short circuit. The first predetermined voltage and the second predetermined voltage are values set beforehand according to a number of the battery cells 3 and the resistance value of the resistor R1 and the like.

As described above, the positive side monitoring circuit 11 has the first positive side monitoring line L11a and the second positive side monitoring line L11b as a path for detecting a short circuit of the first charging inlet relay Ry1. The detector 43 detects the short circuit of the first charging inlet relay Ry1 by double (redundant) monitoring, using the monitoring lines L11a and L11b that detect the short circuit of the first charging inlet relay Ry1.

<Short Circuit Detection for the Second Charging Inlet Relay Ry2>

Figure 6:
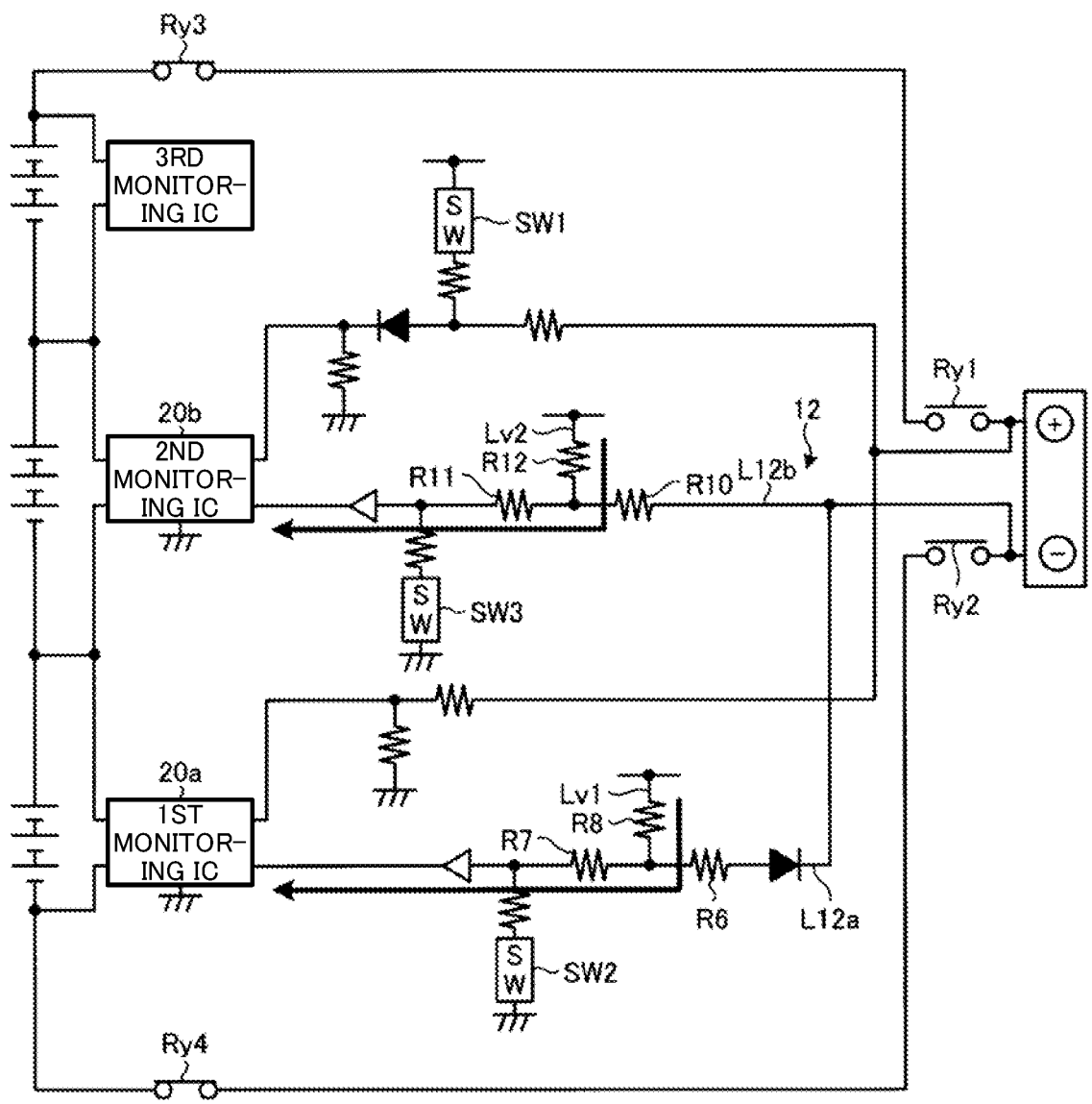
FIG. 6 illustrates a state in which a second charging inlet relay has no short circuit.
Figure 7:
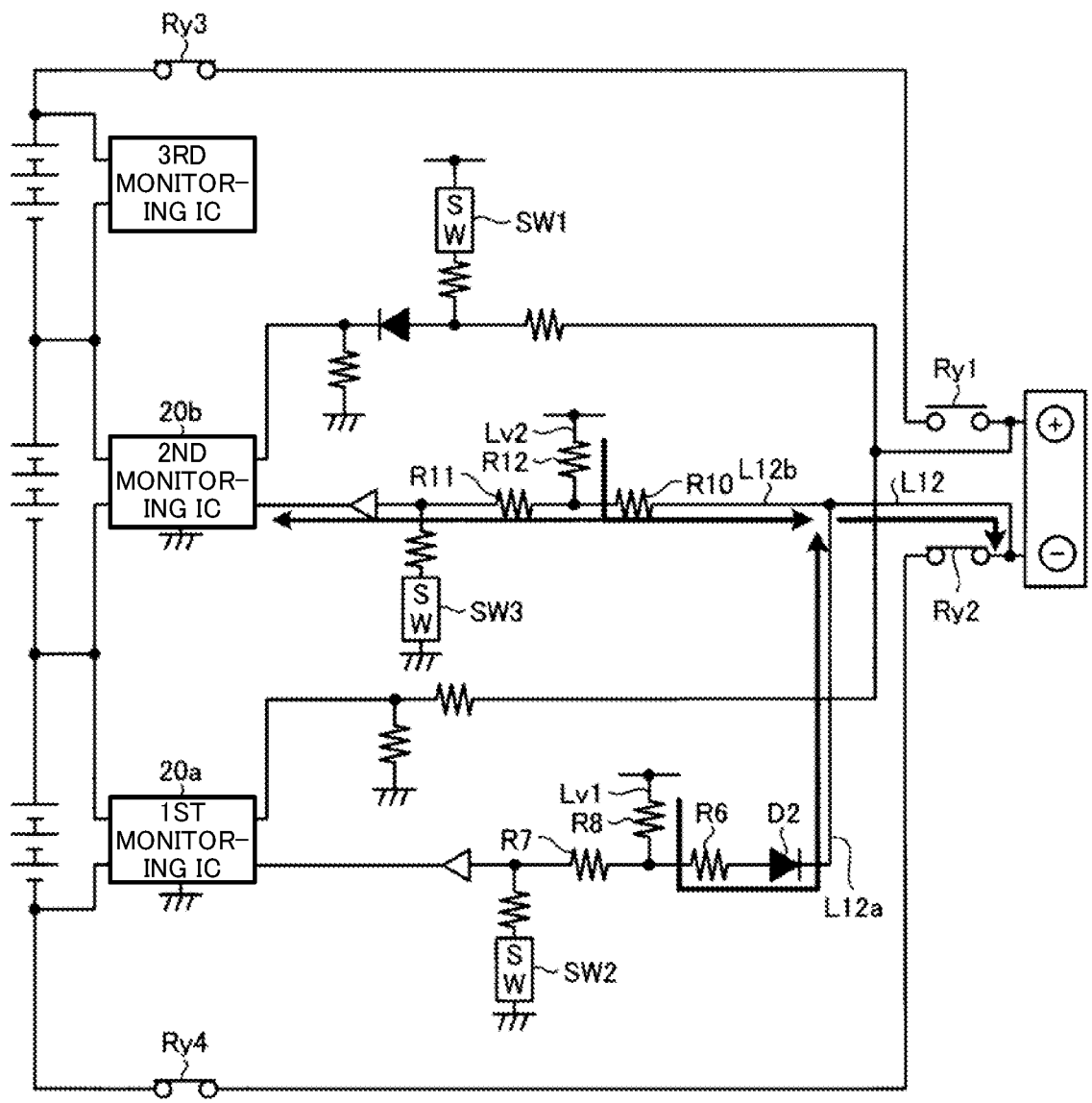
FIG. 7 illustrates a state in which the second charging inlet relay has a short circuit.

Next, detection of Whether or not the second charging inlet relay Ry2 has a short circuit will be described with reference to FIGS. 6 and 7. FIG. 6 illustrates a state in which the second Charging inlet relay Ry2 has no short circuit. FIG. 7 illustrates a state in which the second charging inlet relay Ry2 has a short circuit.

Once the measurement mode is set to the relay short-circuit measurement mode, the switch 41 (refer to FIG. 3) controls the relays Ry1 to Ry4 and the diagnosis switches SW1 to SW3 to cause the first main relay Ry3 and the second main relay Ry4 to be in the ON-state and to cause the first charging inlet relay Ry1, the second Charging inlet relay Ry2 and the diagnosis switches SW1 to SW3 to be in the OFF-state. In the negative side monitoring circuit 12, a voltage is applied to the first voltage line Lv1 due to the internal voltage of the first monitoring IC 20a, and a voltage is applied to the second voltage Lv2 due to the internal voltage of the second monitoring IC 20b.

In a case where the second charging inlet relay Ry2 has no short circuit, as shown in FIG. 6, the current flows from the first voltage line Lv1 in the first negative side monitoring line L12a. In the case where the second charging inlet relay Ry2 has no short circuit, the current does not flow to a side including the resistor R6 of the first negative side monitoring line L12a, but flows to a side including the resistor R7 of the first negative side monitoring line L12a. In the first monitoring IC 20a, the voltage V3 of the first negative side monitoring line L12a is measured according to the internal voltage, the resistance value of the resistor R7 and the resistance value of the resistor R8.

Moreover, in the second negative side monitoring line L12b, as shown in FIG. 6, the current flows from the second voltage line Lv2. In the case where the second charging inlet relay Ry2 has no short circuit, the current does not flow to a side including the resistor R10 of the second negative side monitoring line L12b, but the current flows to a side including the resistor R11 of the second negative side monitoring line L12b. In the second monitoring IC 20b, the voltage V4 of the second negative side monitoring line L12b is measured according to the internal voltage, the resistance value of the resistor R11 and the resistance value of the resistor R12.

On the other hand, in the case where the second charging inlet relay Ry2 has the short circuit, the second common line L12 is connected t) a side of the reference potential of the first monitoring IC 20a. Since the resistance value of the resistor R6 is smaller than the resistance value of the resistor R7 (e.g. approx. ⅕₀), in the first negative side monitoring line L12a, as shown in FIG. 7, the current flows from the first voltage line Lv1 to the side including the resistor R6 of the first negative side monitoring line L12a, and the current little flows to the side including the resistor R7 of the first negative side monitoring line L12a. Thus, the voltage V3 measured by the first monitoring IC 20a is smaller than a voltage that is measured in the case where the second charging inlet relay Ry2 has no short circuit. In the case where the second charging inlet relay Ry2 has the short circuit, the voltage V3 of the first negative-side monitoring line L12a that is measured by the first monitoring IC 20a is equal to or smaller than a third predetermined voltage, and is, for example, substantially 0 (zero) V. The third predetermined voltage is a value set beforehand.

Moreover, since the resistance value of the resistor R10 is smaller h resistance value of the resistor R11 in the second negative side Monitoring line L12b, as shown in FIG. 7, the more current flows from the second voltage line Lv2 to the side including the resistor R10 of the second negative side monitoring line L12b. Thus, the voltage V4 of the second negative side monitoring line L12b measured by the second monitoring IC 20b is smaller than a voltage that is measured in the case where the second charging inlet relay Ry2 has no short circuit, and is equal to or smaller than a fourth predetermined voltage. The fourth predetermined voltage is a value set beforehand. The fourth predetermined voltage is greater than the third predetermined voltage and is set according to the internal voltage and the resistance values of the resistor R10 and the like. Since a reference voltage in the second negative side monitoring line L12b is higher by a difference in potentials between the second negative side monitoring line L12b and the first negative side monitoring line L12a, the resistance value of the resistor R10 is set so as to restrict the current flowing to the side including the resistor R10 of the second negative side monitoring line L12b. Thus, a difference in the resistance values between the resistor R11 and the resistor R10 is relatively small. Therefore, in the case where the second charging inlet relay Ry2 has the short circuit, the current also flows to the side including the resistor R11 of the second negative side monitoring line L12b so that the voltage V4 measured by the second monitoring IC 20b is not substantially 0 (zero) V.

The diode D2 is provided to the first negative side monitoring line L12a. Thus, it is possible to prevent the current from flowing from the second monitoring IC 20b having the higher reference potential to the first monitoring IC 20a having the lower reference potential.

The signals relating to the voltage V3 and the voltage V4 measured by the first monitoring IC 20a and the second monitoring IC 20b, respectively, are sent to the detector 43 (refer to FIG. 3). In a case where the voltage V3 of the first negative side monitoring line L12a is equal to or smaller than the third predetermined voltage, the detector 43 determines that the second Charging inlet relay Ry2 has the short circuit. Moreover, in a case where the voltage V4 of the second negative side monitoring line L12b is equal to or smaller than the fourth predetermined voltage, the detector 43 determines that the second charging inlet relay Ry2 has the Short circuit.

As described above, the negative side monitoring circuit 12 has the first negative side monitoring line L12a and the second negative side monitoring line L12b as a path for detecting a Short circuit of the second charging inlet relay Ry2. The detector 43 detects the short circuit of the second charging inlet relay Ry2 by double (redundant) monitoring, using the monitoring lines L12a and L12b that detect the short circuit of the second charging inlet relay Ry2.

<Positive Side Monitoring Circuit Failure Diagnosis>

Figure 8:
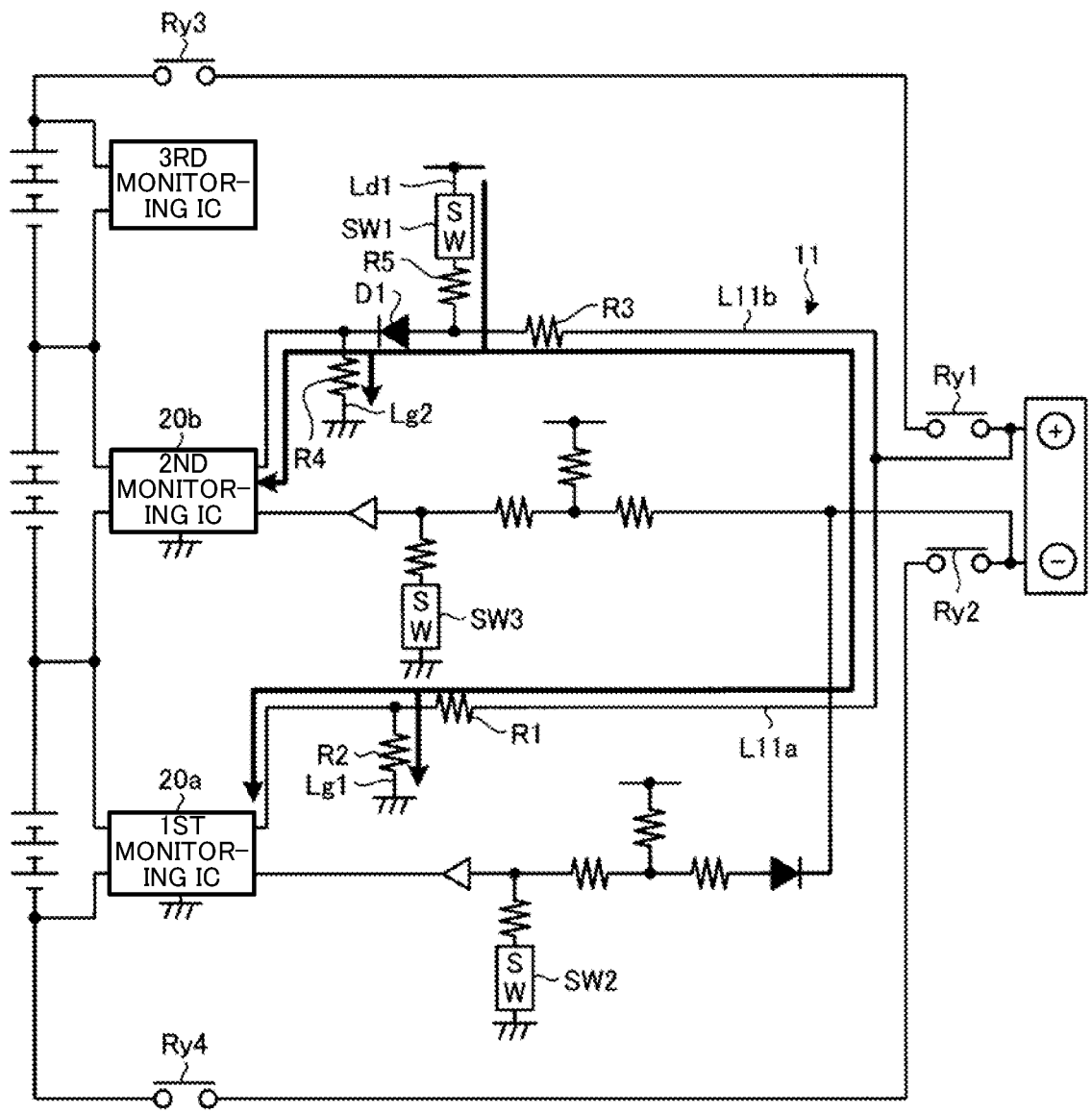
FIG. 8 illustrates a current flow in a case where a positive side monitoring circuit failure diagnosis is performed.

Next, the positive side monitoring circuit failure diagnosis will be described with reference to FIG. 8. FIG. 8 illustrates a current flow in a case where the positive side monitoring circuit failure diagnosis is performed. The positive side monitoring circuit failure diagnosis determines whether or not the resistor R1 provided to the first positive side monitoring line L11a, the resistor R3 provided to the second positive side monitoring line L11b, etc. have a failure.

Once the measurement mode is set to the failure diagnosis mode, the switch 41 (refer to FIG. 3) controls the relays Ry1 to Ry4 and the diagnosis switches SW1 to SW3 to cause the relays Ry1 to Ry4 and the diagnosis switches SW2 and SW3 to be in the OFF-state, and to cause the first diagnosis switch SW1 to be in the ON-state.

Once the first diagnosis switch SW1 is caused to be in the ON-state, in the positive side monitoring circuit 11, the internal voltage of the first monitoring IC 20a is applied to the first diagnosis line Ld1, as shown in FIG. 8, the current flows from the first diagnosis line Ld1 to the first positive side monitoring line L11a and the second positive side monitoring line L11b. The first diagnosis line Ld1 is connected between the diode D1 and the resistor R3 of the second positive side monitoring line L11b. Thus, the current can flow to both of the first positive side monitoring line L11a and the second positive side monitoring line L11b by one first diagnosis line Ld1, and the failure diagnosis for the positive side monitoring circuit 11 can be performed.

In a case where the resistor R1 provided to the first positive side monitoring circuit 11a, the resistor R2 provided to the first grounding conductor Lg1, the resistor R3 and the diode D1 provided to the second positive side monitoring line L11b, the resistor R4 provided to the second grounding conductor Lg2 and the resistor R5 provided to the first diagnosis line Ld1 have no failure, voltages according to the resistance value of the resistor R1 and the like are measured by the first monitoring IC 20a and the second monitoring IC 20b. The voltages that are measured in a case where the resistor R1 and the like have no failure are set beforehand, and are stored, for example, in the detector 43 (refer to FIG. 3).

On the other hand, in a case where the resistor R1 or the like has a failure, the voltage V1 and the voltage V2 measured by the first monitoring IC 20a and the second monitoring IC 20b are greatly different from the voltages that are measured in the case where the resistor R1 and the like have no failure.

In a case where an absolute value of a difference ΔV1 between a voltage of the first positive side monitoring line L11a that is measured in the case where the resistor R1 and the like have no failure and the voltage V1 of the first positive side monitoring line L11a measured by the first monitoring IC 20a is equal to or greater than a first predetermined voltage difference, the detector 43 determines that the positive side monitoring circuit 11 has a failure. Moreover, in a case where an absolute value of a difference ΔV2 between a voltage of the second positive side monitoring line L11b that is measured in the case where the resistor R1 and the like have no failure and the voltage V2 of the second positive side monitoring line L11b measured by the second monitoring IC 20b is equal to or greater than a second predetermined voltage difference, the detector 43 determines that the positive side monitoring circuit 11 has a failure. The first predetermined voltage difference and the second predetermined voltage difference are set beforehand. The detector 43 may identify a location of the failure based on the difference.

<Negative Side Monitoring Circuit Failure Diagnosis>

Figure 9:
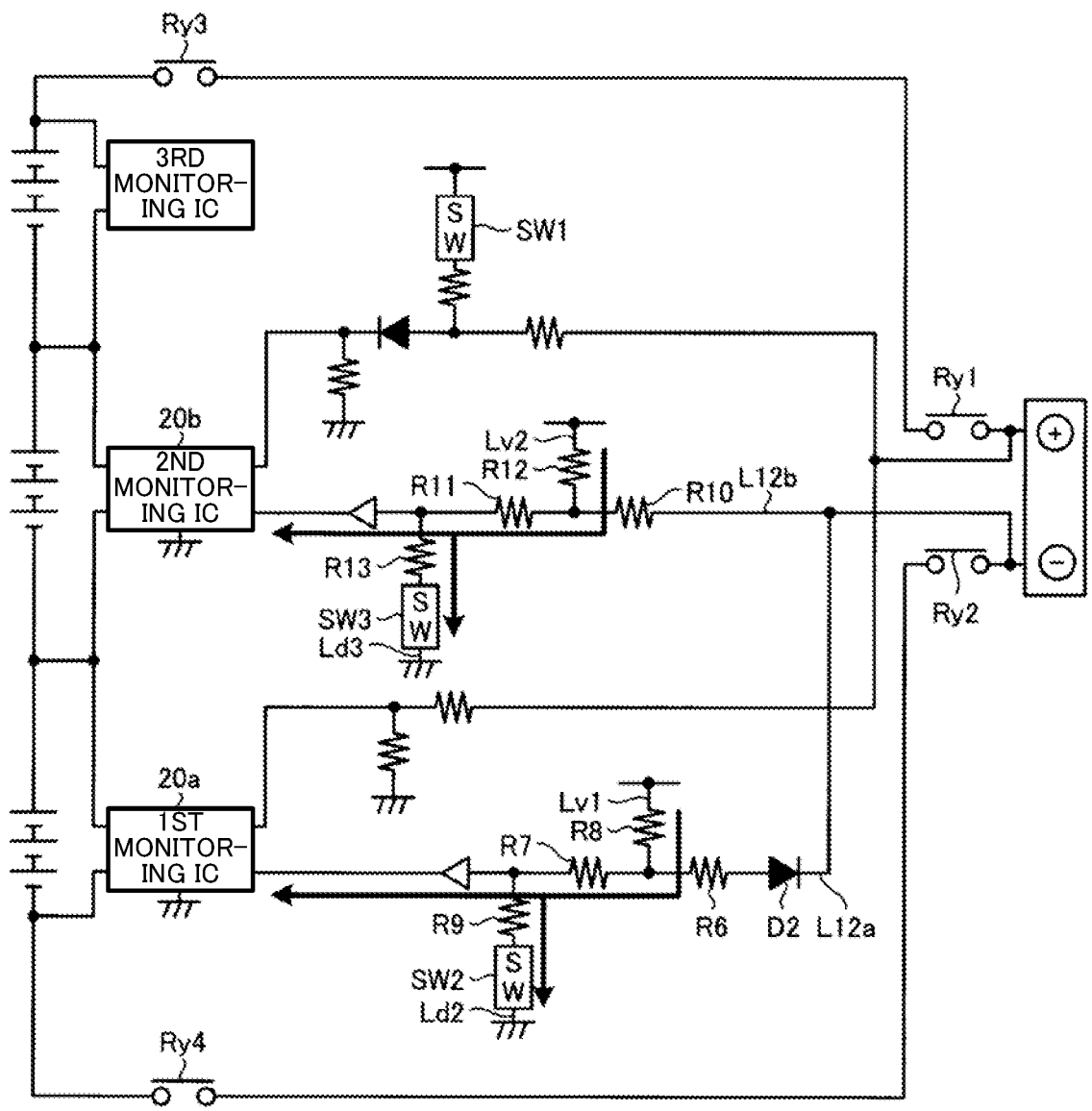
FIG. 9 illustrates a current flow in a case where a negative side monitoring circuit failure diagnosis is performed.

Next, the negative side monitoring circuit failure diagnosis will be described with reference to FIG. 9. FIG. 9 illustrates a current flow in a case where the negative side monitoring circuit failure diagnosis is performed. The negative side monitoring circuit failure diagnosis determines whether or not the resistor R7 provided to the first negative side monitoring line L12a, the resistor R11 provided to the second negative side monitoring line L12b, etc. have a failure.

Once the measurement mode is set to the failure diagnosis mode, the switch 41 (refer to FIG. 3) controls the relays Ry1 to Ry4 and the diagnosis switches SW1 to SW3 to cause the relays Ry1 to Ry4 and the diagnosis switches SW1 to be in the OFF-state, and to cause the diagnosis switches SW2 and SW3 to be in the ON-state.

Once the second diagnosis switch SW2 and the third diagnosis switch SW3 are caused to be in the ON-state, in the first negative side monitoring line L12a, as shown in FIG. 9, the current flows from the first voltage line Lv1 to the side including the resistor R7 of the first negative side monitoring line L12a. Moreover, in the second negative side monitoring line L12b the current flows from the second voltage line Lv2 to the side having the resistor R11 of the second negative side monitoring line L12b and to the third diagnosis line Ld3.

In a case where the resistor R7 provided to the first negative side monitoring line L12a, the resistor R8 provided to the first voltage line Lv1 and the resistor R9 provided to the second diagnosis line Ld2 have no failure, a voltage according to the resistance values of the resistor R7, the resistor R8 and the resistor R9 is measured in the first monitoring IC 20a. The voltage that is measured in a case where the resistor R7 and the like have no failure is set beforehand, and is stored, for example; in the detector 43 (refer to FIG. 3).

On the other hand, in a case where the resistor R7 or the like provided to the first negative side monitoring line L12a has a failure, the voltage V3 measured by the first monitoring IC 20a is greatly different from the voltage that is measured in the case where the resistor R7 and the like have no failure.

In a case where the resistor R11 provided to the second negative side Monitoring line L12b, the resistor R12 provided to the second voltage line Lv2 and the resistor R13 provided to the third diagnosis line Ld3 have no failure, a voltage according to the resistance values of the resistor R11 to the resistor R13 is measured in the second monitoring IC 20b. The voltage that is measured in a case where the resistor R11 and the like have no failure is set beforehand, and is stored, for example, in the detector 43.

On the other hand, in a case where the resistor R11 or the like provided to the second negative side monitoring line L12b have a failure, the voltage V4 measured by the second monitoring IC 20b is greatly different from the voltage that is measured in the case where the resistor R11 and the like have no failure.

In a case where an absolute value of a difference ΔV3 between a voltage of the first negative side monitoring line L12a that is measured in the case where the resistor R7 and the like have no failure and the voltage V3 of the first negative side monitoring line L12a measured by the first monitoring IC 20a is equal to or greater than a third predetermined voltage difference, the detector 43 determines that the negative side monitoring circuit 12 has a failure. Moreover, in a case where an absolute value of a difference ΔV4 between a voltage of the second negative side monitoring line L12b that is measured in the case where the resistor R11 and the like have no failure and the voltage V4 of the second negative side monitoring line L12b measured by the second monitoring IC 20b is equal to or greater than a fourth predetermined voltage difference, the detector 43 determines that the negative side monitoring circuit 12 has a failure. The third predetermined voltage difference and the fourth predetermined voltage difference are set beforehand. The detector 43 may identify a location of the failure based on the difference. In this negative side monitoring circuit failure diagnosis, the failure diagnosis for the resistor R6, the diode D2 and the resistor R10 cannot be performed. However, the failure diagnosis for those components is performed by use of voltages measured by the first monitoring IC 20a and the second monitoring IC 20b when the second charging inlet relay Ry2 is caused to be in the ON-state. For example, in the negative side monitoring circuit failure diagnosis, while the first negative side monitoring line L12a is determined to have no failure and the second charging inlet relay Ry2 is caused to be in the ON-state in a case where the voltage V3 measured by the first monitoring IC 20a is greatly different from a voltage that is measured at a normal time period, the detector 43 determines that the resistor R6 or the diode D2 has a failure. Moreover, in another example of the failure diagnosis for the resistor R6, the diode D2 and the resistor R10, in a case where both of the first negative side monitoring line L12a and the second negative side monitoring line 112b are determined to have no failure, the voltage V3 measured by the first monitoring IC 20a is compared to the voltage V4 measured by the second monitoring IC 20b, in a case Where a compared result is greatly different from a voltage difference obtained in the normal time period, the detector 43 determines that the resistor R6, the diode D2 or the resistor R10 has a failure. Since storing results of those failure diagnoses, the detector 43 performs a comprehensive failure diagnosis for the negative side monitoring circuit 12 based on the results when the negative side monitoring circuit failure diagnosis is performed.

<First Charging Inlet Relay Short-Circuit Detection Process>

Figure 10:
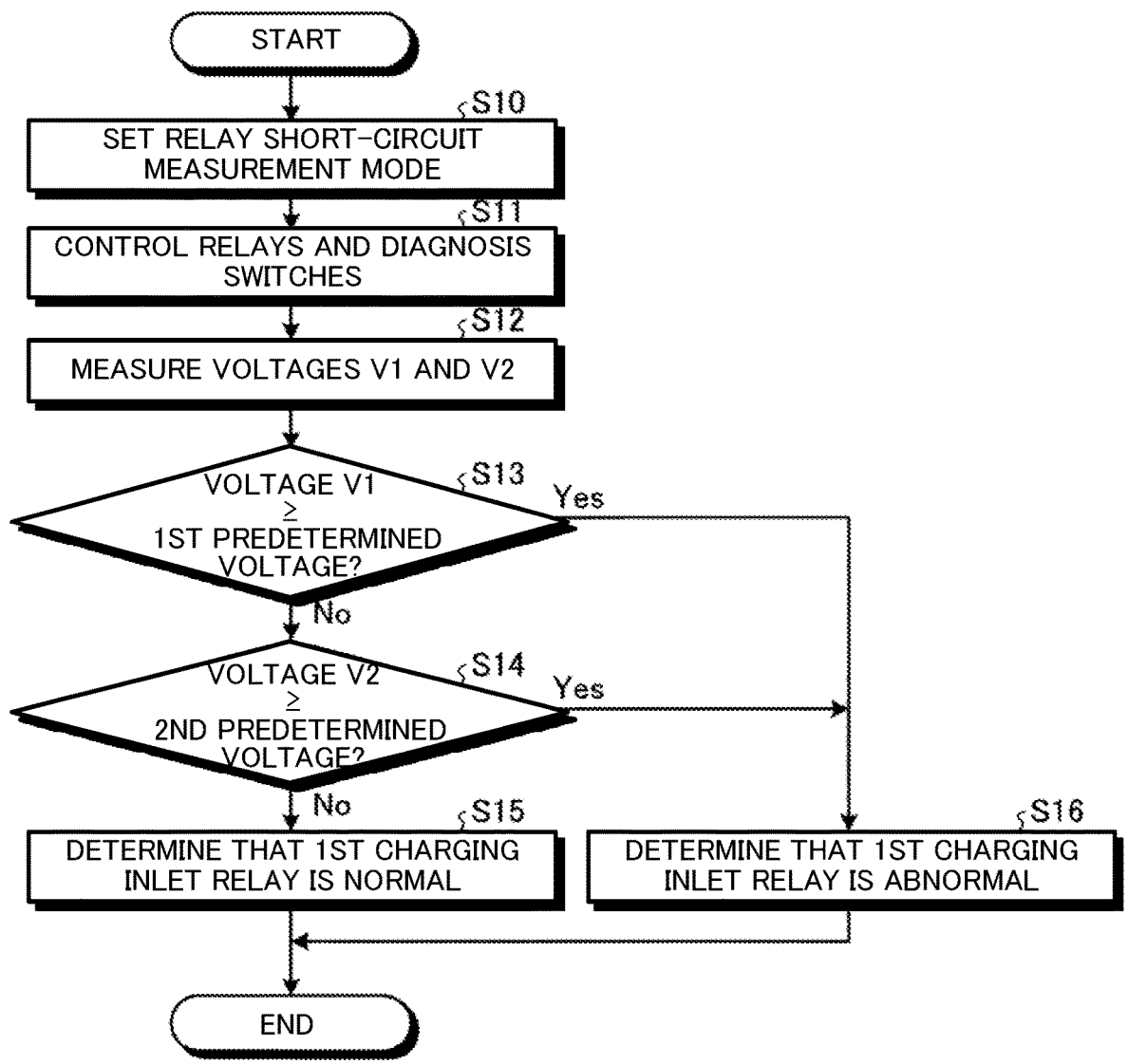
FIG. 10 is a flowchart showing a first charging inlet short-circuit detection process.

Next, a first charging inlet relay short-circuit detection process will be described with reference to FIG. 10. FIG. 10 is a flowchart showing the first charging inlet relay short-circuit detection process.

The mode switch 42 sets the measurement mode to the relay short-circuit measurement mode (a step S10).

The switch 41 controls the relays Ry1 to Ry4 and the diagnosis switches SW1 to SW3 to cause the first main relay Ry3 and the second main relay Ry4 to be in the ON-state, and to cause the first charging inlet relay Ry1, the second charging inlet relay Ry2 and the diagnosis switches SW1 to SW3 to be in the OFF-state (a step S11).

The first monitoring IC 20a measures the voltage V1 of the first positive side monitoring line L11a (a step S12). The second monitoring IC 201 measures the voltage V2 of the second positive side monitoring line L11b (the step S12).

The detector 43 determines whether or not the voltage V1 of the first positive side monitoring line L11a measured by the first monitoring IC 20a is equal to or greater than the first predetermined voltage (a step S13). In a case where the voltage V1 of the first positive side monitoring line L11a is smaller than the first predetermined voltage (No in the step S13), the detector 43 determines whether or not the voltage V2 of the second positive side monitoring line L11b measured by the second monitoring IC 20b is equal to or greater than the second predetermined voltage (a step S14).

In a case where the voltage V2 of the second positive side monitoring line L11b is smaller than the second predetermined voltage (No in the step S14), in other words, in a case where i) the voltage V1 of the first positive side monitoring line L11a is smaller than the first predetermined voltage and ii) the voltage V2 of the second positive side monitoring line L11b is smaller than the second predetermined voltage, the detector 43 determines that the first Charging inlet relay Ry1 has no short circuit and is normal (a step S15).

In a case where the voltage V1 of the first positive side monitoring line L11a is equal to or greater than the first predetermined voltage (Yes in the step S13), or in a case where the voltage V2 of the second positive Side monitoring line L11b is equal to or greater than the second predetermined voltage (Yes in the step S14), the detector 43 determines that the first charging inlet relay Ry1 has the short circuit and is abnormal (a step S16)

<Second Charging Inlet Relay Short-Circuit Detection Process>

Figure 11:
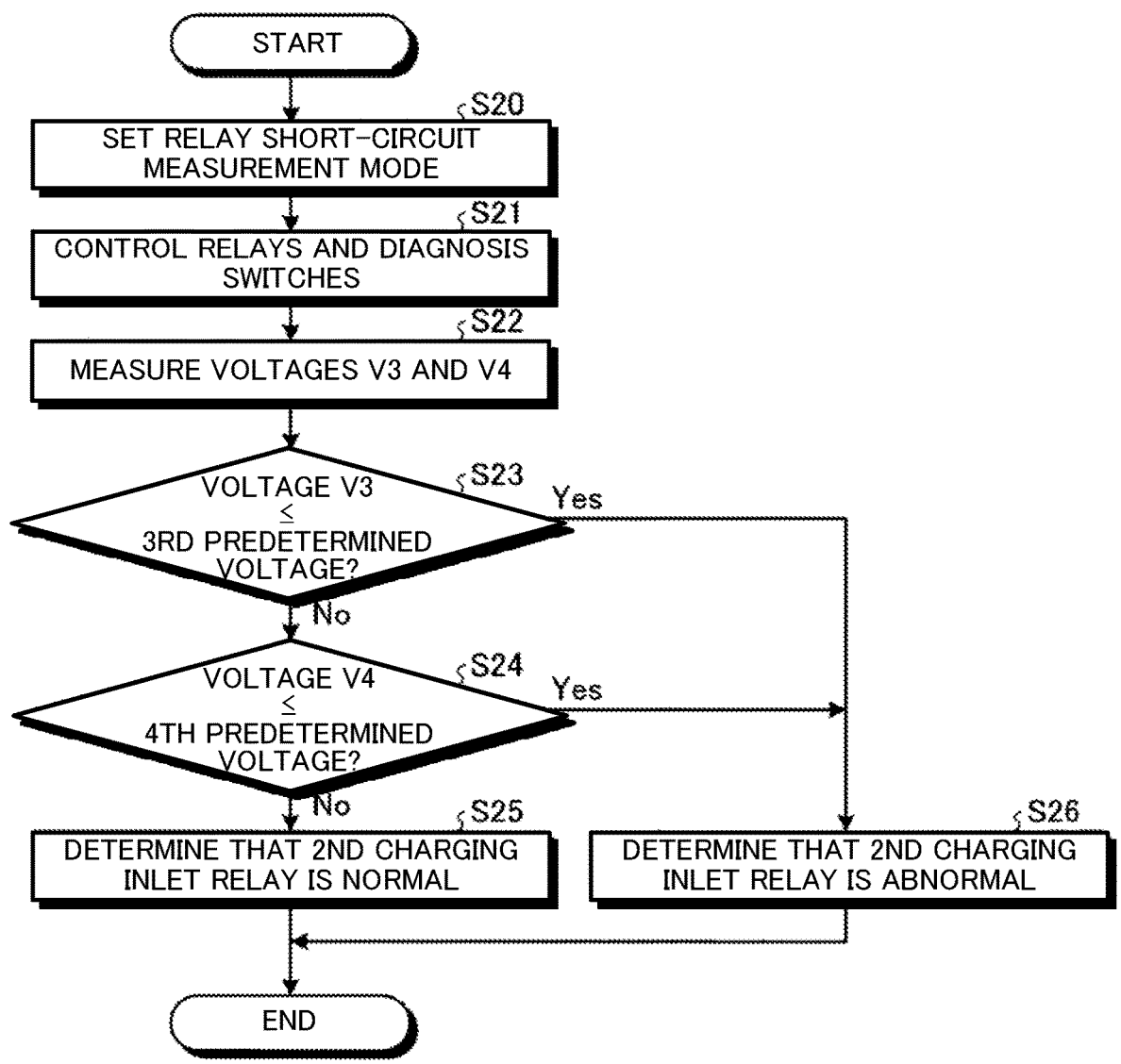
FIG. 11 is a flowchart showing a second charging inlet relay short-circuit detection process.

Next, a second charging inlet relay short-circuit detection process will be described with reference to FIG. 11. FIG. 11 is a flowchart showing the second charging inlet relay short-circuit detection process.

The mode switch 42 sets the measurement mode to the relay short-circuit measurement mode (a step S20).

The switch 41 controls the relays Ry1 to Ry4 and the diagnosis switches SW1 to SW3 to cause the first main relay Ry3 and the second main relay Ry4 to be in the ON-state, and to cause the first charging inlet relay Ry1, the second charging inlet relay Ry2 and the diagnosis switches SW1 to SW3 to be in the OFF-state (a step S21).

The first monitoring IC 20a measures the voltage V3 of the first negative side monitoring line L12a (a step S22). The second monitoring IC 20b measures the voltage V4 of the second negative side monitoring line L12b (the step S22).

The detector 43 determines whether or not the voltage V3 of the first negative side monitoring line L12a measured by the first monitoring IC 20a is equal to or smaller than the third predetermined voltage (a step S23). In a case where the voltage V3 of the first negative side monitoring line L12a is greater than the third predetermined voltage (No in the step S23), the detector 43 determines whether or not the voltage V4 of the second negative side monitoring line L12b measured by the second monitoring IC 20b is equal to or smaller than the fourth predetermined voltage (a step S24).

In a case where the voltage V4 of the second negative side monitoring line L12b is greater than the fourth predetermined voltage (No in the step S24), in other words, a case where i) the voltage V3 of the first negative side monitoring line L12a is higher than the third predetermined voltage and ii) the voltage V4 of the second negative side monitoring line L12b is greater than the fourth predetermined voltage, the detector 43 determines that the second charging inlet relay Ry2 has no short circuit and is normal (a step S25).

In a case where the voltage V3 of the first negative side monitoring line L12a is equal to or smaller than the third predetermined voltage (Yes in the step S23), or in a case where the voltage V4 of the second negative side monitoring line L12b is equal to or greater than the fourth predetermined voltage (Yes in the step S24), the detector 43 determines that the second charging inlet relay Ry2 has the short circuit and is abnormal (a step S26).

<Positive Side Monitoring Circuit Failure Diagnosis Process>

Figure 12:
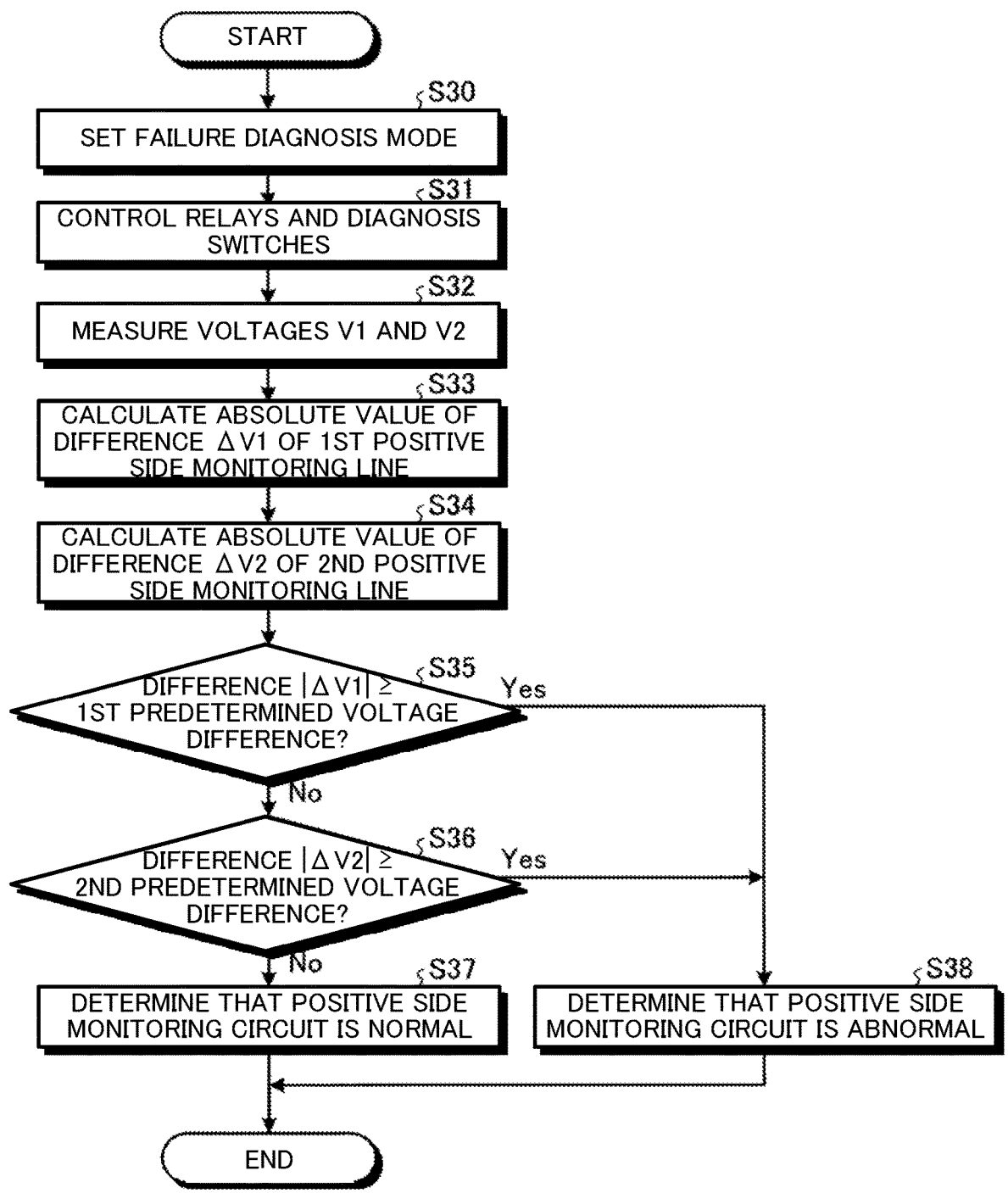
FIG. 12 is a flowchart showing a positive side monitoring circuit failure diagnosis process.

Next, a positive side monitoring circuit failure diagnosis process will be described with reference to FIG. 12. FIG. 12 is a flowchart showing the positive side monitoring circuit failure diagnosis process.

The mode switch 42 sets the measurement mode to the failure diagnosis mode (a step S30).

The switch 41 controls the relays Ry1 to Ry4 and the diagnosis switches SW1 to SW3 to cause the relays Ry1 to Ry4, the second diagnosis switch SW2 and the third diagnosis switch SW3 to be in the OFF state, and to cause the first diagnosis switch SW1 to be in the ON-state (a step S31).

The first monitoring IC 20a measures the voltage V1 of the first positive side monitoring line L11a (a step S32). The second monitoring IC 20b measures the voltage V2 of the second positive side monitoring line L11b (the step S32).

The detector 43 calculates an absolute value of the difference ΔV1 between a voltage of the first positive side monitoring line L11a that is measured in a case Where the positive side monitoring circuit 11 has no failure and the voltage V1 of the first positive side monitoring line L11a measured by the first monitoring IC 20a (a step S33). The detector 43 calculates an absolute value of the difference ΔV2 between a voltage of the second positive side monitoring line L11b that is measured in the case Where the positive side monitoring circuit 11 has no failure and the voltage V2 of the second positive side monitoring line L11b measured by the second monitoring IC 20b (a step S34).

The detector 43 determines whether or not the absolute value of the difference ΔV1 in the first positive side monitoring line L11a is equal to or greater than the first predetermined voltage difference (a step S35). In a case where the absolute value of the difference ΔV1 in the first positive side monitoring line L11a is smaller than the first predetermined voltage difference (No in the step S35), the detector 43 determines whether or not the absolute value of the difference ΔV2 in the second positive side monitoring line L11b is equal to or greater than the second predetermined voltage difference (a step S36) In a case where the absolute value of the difference ΔV2 in the second positive side monitoring line L11b is smaller than the second predetermined voltage difference (No in the step S36), in other words, in a case where i) the absolute value of the difference ΔV1 in the first positive side monitoring line L11a is smaller than the first predetermined voltage difference and ii) the absolute value of the difference ΔV2 in the second positive side monitoring line L11b is smaller than the second predetermined voltage difference, the detector 43 determines that the positive side monitoring circuit 11 has no failure and is normal (a step S37).

In a case where the absolute value of the difference ΔV1 in the first positive side monitoring line L11a is equal to or greater than the first predetermined voltage difference (Yes in the step S35), or in a case where the absolute value of the difference ΔV2 in the second positive side monitoring line L11b is equal to or greater than the second predetermined voltage difference (Yes in the step S36), the detector 43 determines that the positive side monitoring circuit 11 has a failure and is abnormal (a step S38).

<Negative Side Monitoring Circuit Failure Diagnosis Process>

Figure 13:
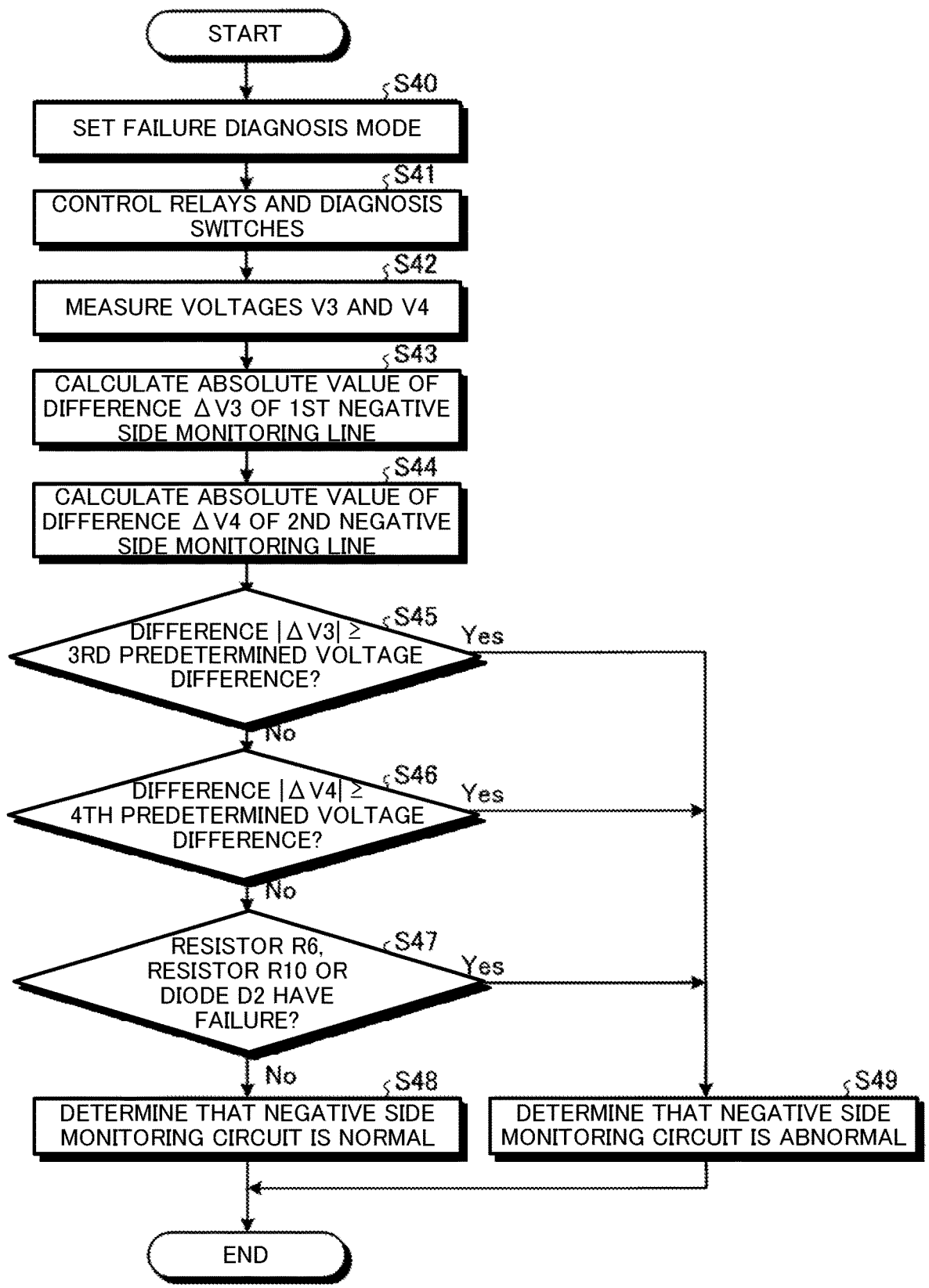
FIG. 13 is a flowchart showing a negative side monitoring circuit failure diagnosis process.

Next, a negative side monitoring circuit failure diagnosis process will be described with reference to FIG. 13. FIG. 13 is a flowchart showing the negative side monitoring circuit failure diagnosis process. The failure diagnosis for each of the resistor R6, the diode D2 and the resistor R10 is performed when the second charging inlet relay Ry2 is caused to be in the ON-state, and a result of each failure diagnosis is stored in the detector 43.

The mode switch 42 sets the measurement mode to the failure diagnosis mode (a step S40).

The switch 41 controls the relays Ry1 to Ry4 and the diagnosis switches SW1 to SW3 to cause the relays Ry1 to Ry4 and the first diagnosis switch SW1 to be in the OFF-state, and to cause the second diagnosis switch SW2 and the third diagnosis switch SW3 to be in the ON-state (a step S41).

The first monitoring IC 20a measures the voltage V3 of the first negative side monitoring line L12a (a step S42). The second monitoring IC 20b measures the voltage V4 of the second negative side monitoring line L12b (the step S42).

The detector 43 calculates an absolute value of the difference ΔV3 between a voltage of the first negative side monitoring line L12a that is measured in a case where the negative side monitoring circuit 12 has no failure and the voltage V3 of the first negative side monitoring line L12a measured by the first monitoring IC 20a (a step S43). The detector 43 calculates an absolute value of the difference ΔV4 between a voltage of the second negative side monitoring line L12b that is measured the case where the negative side monitoring circuit 12 has no failure and the voltage 4 of the second negative side monitoring line L12b measured by the second monitoring IC 20b (a step S44).

The detector 43 determines whether or not the absolute value of the difference ΔV3 in the first negative side monitoring line L12a is equal to or greater than the third predetermined voltage difference (a step S45). In a case where the absolute value of the difference ΔV3 in the first negative side monitoring line L12a is smaller than the third predetermined voltage difference (No in the S45), the detector 43 determines whether or not the absolute value of the difference ΔV4 in the second negative side monitoring line L12b is equal to or greater than the fourth predetermined voltage difference (a step S46).

In a case Where the absolute Value of the difference ΔV4 in the second negative side monitoring line L12b is smaller than the fourth predetermined voltage difference (No in the step S46), the detector 43 determines whether or not the resistor R6, the diode D2 and the resistor R10 have a failure (a step S47). More specifically, the detector 43 reads out the stored results of the failure diagnosis performed for the resistor R6, the diode D2 and the resistor R10.

In the case where the resistor R6, the diode D2 and the resistor R10 have no failure (No in the step S47), in other words, in a case where i) the absolute value of the difference ΔV3 in the first negative side monitoring line L12a is smaller than the third predetermined voltage difference, ii) the absolute value of the difference ΔV4 in the second negative side monitoring line L12b is smaller than the fourth predetermined voltage difference, and iii) the resistor R6, the diode D2 and the resistor R10 have no failure, the detector 43 determines that the negative side monitoring circuit 12 has no failure and is normal (a step S48).

In a case where the absolute value of the difference ΔV3 in the first negative side monitoring line L12a is equal to or greater than the third predetermined voltage difference (Yes in the step S45), or in a case where the absolute value of the difference ΔV4 in the second negative side monitoring line L12b is equal to or greater than the fourth predetermined voltage difference (Yes in the step S46), or in a case where the resistor R6, the diode D2 or the resistor R10 has a failure (Yes in the step S47), the detector 43 determines that the negative side monitoring circuit 12 has a failure and is abnormal (a step S49)

<Effect of the Embodiment>

As another method of detecting a short circuit of the first charging inlet relay and the second charging inlet relay, for example, it is possible to use a method of detecting the short circuit of those relays based on voltages measured by a measurement part of the low voltage system that is insulated from the high voltage system by use of a flying capacitor. However, a circuit for the flying capacitor includes an expensive component, such as a PhotoMOS relay. For example, a PhotoMOS relay built in the high voltage system needs to have high performance of withstand voltage. The PhotoMOS relay having the high performance of withstand voltage is expensive. Moreover, there is a possibility that an existing component cannot be used so that a Cost of the flying capacitor increases. When such a flying capacitor is used, it is necessary to use a component that ensures insulation between the high voltage system and the low voltage system and to ensure an insulation distance. Thus, the cost will increase and a size of an apparatus may also increase.

In this embodiment, whether or not the first charging inlet relay Ry1 or the second charging inlet relay Ry2 has a short circuit is detected based on voltages measured by the first monitoring IC 20a and the second monitoring IC 20b in the high voltage system. Thus, for example, this system can measure a voltage in the case where the first charging inlet relay Ry1 or the second charging inlet relay Ry2 has a short circuit without the flying capacitor, and can detect the short circuit of the first charging inlet relay Ry1 or the second charging inlet relay Ry2 based on the measured voltage. Thus, it is unnecessary to use the expensive component to find the short circuit of the first charging inlet relay Ry1 or the second charging inlet relay Ry2. The cost can be reduced.

Moreover, for example, since the voltages of the first positive side monitoring line L11a and the first negative side monitoring line L12a can be measured by the first monitoring IC 20a in the high voltage system, it is unnecessary to include a component and the like to ensure insulation between the high voltage system and the low voltage system. Thus, the cost can be reduced. Further, it is possible to reduce a number of parts, to decrease the cost and miniaturize the apparatus.

Moreover, by use of the first monitoring IC 20a and the second monitoring IC 20b that measure the voltages of the battery cell 3, a voltage in a case where the first charging inlet relay Ry1 or the second charging inlet relay Ry2 has a short circuit is measured. Since the short circuit of the first charging inlet relay Ry1 or the second charging inlet relay Ry2 is detected based on the measured voltages, it is possible to detect whether or not the first charging inlet relay Ry1 or the second charging inlet relay Ry2 has the short circuit without an additional measurement apparatus.

For example, the voltage V1 of the first positive side monitoring line L11a is measured, and the voltage V2 of the second positive side monitoring line L11b is measured. Whether or not the first charging inlet relay Ry1 has the short circuit is detected based on the voltage V1 and the voltage V2 measured in the monitoring lines L11a and L11b. In other words, whether or not the first charging inlet relay Ry1 has the short circuit is detected through the redundant monitoring. Thus, it is possible to accurately detect whether or not the first charging inlet relay Ry1 has the short circuit. Similarly, it is possible to detect whether or not the second charging inlet relay Ry2 has the short circuit.

Since the diodes D1 and D2 are provided to prevent current from flowing from the second monitoring IC 20b having a higher reference potential to the first monitoring IC 20a having a lower reference potential, it is possible to accurately detect, for example, whether or not the first charging inlet relay Ry1 has the short circuit.

A voltage measured by the second monitoring IC 20b having the higher reference potential is adjusted based on a potential difference between the first monitoring IC 20a having the lower reference potential and the second monitoring IC 20*b*. Thus, it is possible that the voltage is accurately measured by the second monitoring IC 20*b*.

In a case where the first charging inlet relay Ry1 has the short circuit, for example, the voltage V1 of the first positive side monitoring line L11*a* is measured by the first monitoring IC 20*a*. It is possible to detect, based on the measured voltage V1, whether or not the first charging inlet relay Ry1 has the short circuit. In a case where the second charging inlet relay Ry2 has the short circuit, the voltage V3 of the first negative side Monitoring line L12*a* is measured, for example, by the first monitoring IC 20*a*. Then, it is possible to detect, based on the measured voltage V3, whether or not the second charging inlet relay Ry2 has the short circuit. In other words, even in the case where one of the first charging inlet relay Ry1 and the second charging inlet relay Ry2 has the short circuit, it is possible to detect the short circuit. Therefore, it is possible to quickly detect the short circuit in the case where the first charging inlet relay Ry1 or the second charging inlet relay Ry2 has the short circuit.

Moreover, in order to detect whether or not the second charging inlet relay Ry2 has the short circuit, the internal voltage is applied, and, for example, the voltage V3 of the first negative side monitoring line L12*a* is measured by the first monitoring IC 20*a*. Thus, whether or not the second charging inlet relay Ry2 has the short circuit is detected. As described above, even in the case where the second charging inlet relay Ry2 has the short circuit, it is possible to detect whether or not the second charging inlet relay Ry2 has the short circuit.

The first charging inlet relay Ry1 and the second charging inlet relay Ry2 are caused to be in the OFF-state. Then, a current is caused to flow to the positive side monitoring circuit 11 and the negative side monitoring circuit 12, acid then voltages are measured by the first monitoring IC 20*a* and the second monitoring IC 20*b*. Thus, the failure diagnosis is performed for the positive side monitoring circuit 11 and the negative side monitoring circuit 12.

By connecting the first diagnosis line Ld1 to the second positive side monitoring line L11*b* between the diode D1 and the first monitoring IC 20*a* having the lower reference potential, the failure diagnosis can be performed for the positive side monitoring circuit 11 (the first positive side monitoring line L11*a* and the second positive side monitoring line L11*b*) by one first diagnosis line Ld1.

For example, since the resistor R1 is provided to the first positive side monitoring line L11*a*, it is possible to restrict (adjust) the current flowing to the first positive side monitoring line L11*a*. Therefore, by changing the resistance value of the resistor R1, it is possible to adjust, for example, the current and the like flowing to the first monitoring IC 20*a* and/or to the charging inlet 10 in a case where the first charging inlet relay Ry1 has the short circuit. Moreover, providing a resistor having a certain resistance value may be implemented, for example, by providing one or more resistors and insulation performance of the circuit can be easily changed according to the used component. Moreover, in a case where the first charging inlet relay Ry1 has a short circuit, a current flowing to the first monitoring IC 20*a*, the charging inlet 10, etc. may be adjusted, for example, by increasing or decreasing resistance, according to a voltage of the assembled battery 1. As described above, design of the circuit can be more flexible.

<Example of Application to Charging and Discharging System>

Figure 14:
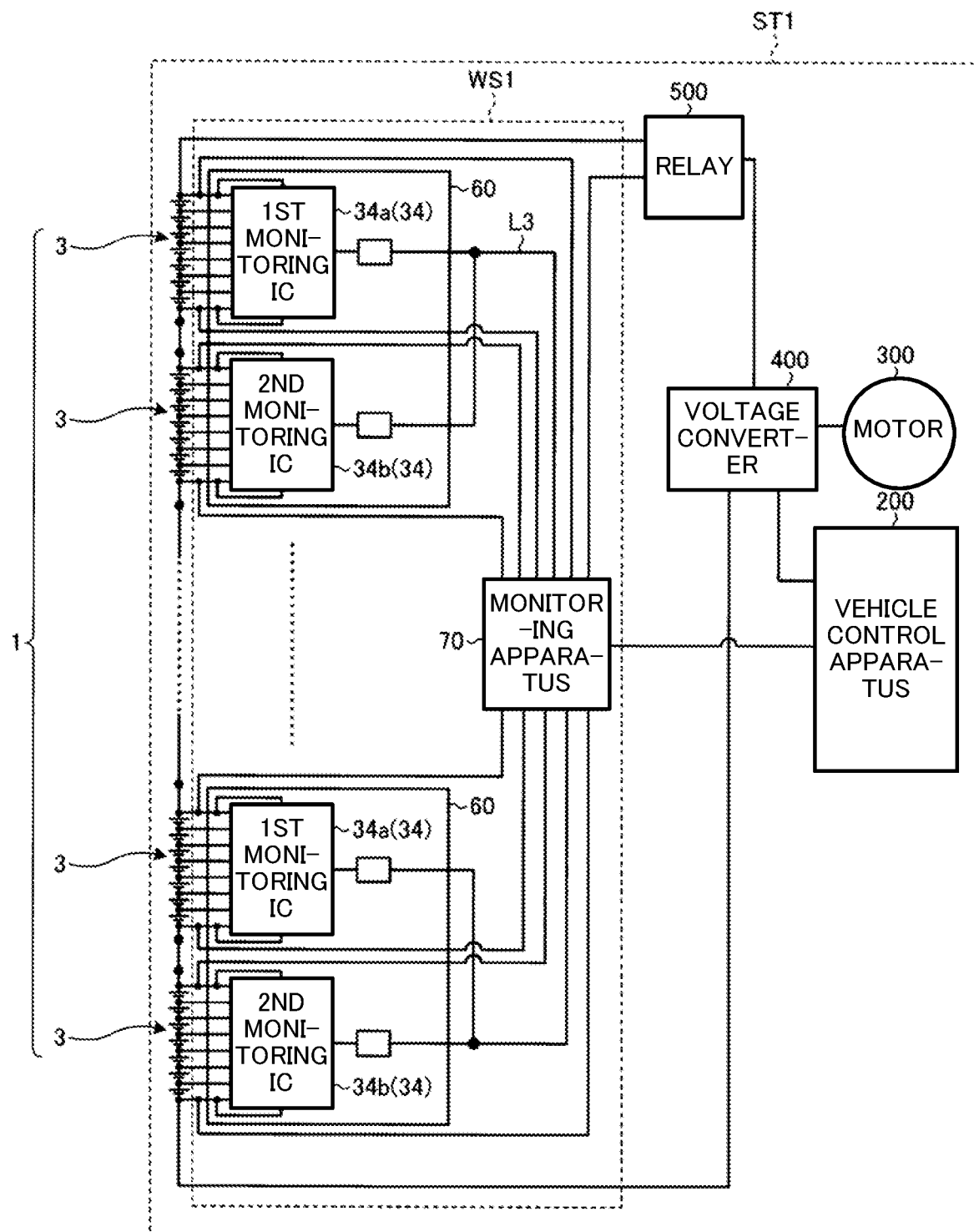
FIG. 14 is a block diagram wing an example of a configuration of a charging and discharging system.

Next described, with reference to FIG. 14, will be a case in which the assembled battery system 100 shown in FIG. 1 is applied to a charging and discharging system ST1. FIG. 14 is a block diagram showing an example of a configuration of the charging and discharging system ST1. The charging and discharging system ST1 is used as a drive source of a vehicle, such as a hybrid electric vehicle (HEV), an electric vehicle (EV) and a fuel cell vehicle (FCV).

The charging and discharging system ST1 includes an assembled battery 1, a battery monitoring system WS1, a vehicle control apparatus 200, a motor 300, a voltage converter 400 and a relay 500. Moreover, the battery monitoring system WS1 includes a plurality of satellite substrates 60 having a monitoring IC 34 and the like, and a monitoring apparatus 70. Moreover, the assembled battery 1 and the battery monitoring system WS1 included in the charging and discharging system ST1 are equivalent to the assembled battery system 100 shown in FIG. 1.

The assembled battery 1 shown in FIG. 14 is insulated from a vehicle body and is configured by a plurality of blocks. In one block, a plurality of battery cells 3 are connected in series, and each of the plurality of battery cells 3 is electrically connected to the monitoring IC 34 provided to each of the plurality of satellite substrates 60. Thus, voltages of the battery cells 3 in one block are measured by the monitoring ICs 34 provided to one satellite substrate 60.

Two of the monitoring ICs, a first monitoring IC 34*a* and a second monitoring IC 34*b*, are provided to each of the satellite substrates 60. The plurality of battery cells 3 in one block are divided into two. The first monitoring IC 34*a* monitors one of the two divided blocks, and the second monitoring IC 34*b* monitors the other so that those monitoring ICs monitor the block as one group. The first monitoring IC 34*a* and the second monitoring IC 34*b* are equivalent to the first monitoring IC 20*a* and the second monitoring IC 20*b*, respectively, shown in FIG. 1. More specifically, the first monitoring IC 34*a* is one of the first monitoring ICs 34*a* that measures a voltage of one of the battery cells 3 having a smallest reference potential, and the second monitoring IC 34*b* is one of the second monitoring ICs 34*b* that is provided to a same satellite substrate 60 to which the one first monitoring IC 34*a* is provided. Moreover, the first monitoring IC 34*a* provided to one satellite substrate 60 adjacent to the satellite substrate 60 having the first monitoring IC 34*a* that monitors the voltage of one battery cell 3 having a smallest reference potential is equivalent to the third monitoring IC 20*c* shown in FIG. 1.

A monitoring apparatus 70 detects whether or not a first charging inlet relay Ry1 and a second Charging inlet relay Ry2 shown in FIG. 1 have a short circuit, based on signals indicative of voltages sent from the first monitoring IC 34*a* and the second monitoring IC 34*b* via a communication line L3. Moreover, the monitoring apparatus 70 performs a failure diagnosis for a positive side monitoring circuit 11 and a negative side monitoring circuit 12 shown in FIG. 1 based on the signals indicative of the voltages sent from the first monitoring IC 34*a* and the second monitoring IC 34*b* via the communication line L3. The monitoring apparatus 70 is equivalent to the controller 40 in FIG. 1.

Moreover, it is recommended that the monitoring apparatus 70 should include a function of determining whether or not the monitoring IC 34 is working normally. For example, the monitoring apparatus 70 compares a stack voltage obtained by adding individual voltages of the battery cells 3 received from the monitoring IC 34 with a stack voltage directly detected, and determines that the monitoring IC 34 has a failure in a case where a difference between those stack voltages is greater than an allowable value. In a case where the monitoring apparatus 70 determines that the monitoring IC 34 has a failure, the monitoring apparatus 70 performs a failsafe function.

The vehicle control apparatus 200 charges and discharges the assembled battery 1, based on a charged stated of the assembled battery 1. More specifically, in a case where the assembled battery 1 is overcharged, the vehicle control apparatus 200 causes a voltage converter 400 to convert voltage charged in the assembled battery 1 from direct current to alternating current to drive the motor 300. Thus, a voltage of the assembled battery 1 is discharged.

Moreover, in a case where the assembled battery 1 is overdischarged, the vehicle control apparatus 200 causes the voltage converter 400 to convert the voltage generated by the motor 300 through regenerative braking from alternating current to direct current. Thus, the assembled battery 1 is charged with the voltage. As described above, the vehicle control apparatus 200 monitors the voltage of the assembled battery 1 based on the charged state of the assembled battery 1 obtained from the monitoring apparatus 70, and performs control based on a result of monitoring.

<Modifications>

In an assembled battery system 100 of a modification, a buffer B1 is not provided to a first negative side monitoring line L12a, and also a buffer B2 is not provided to a second negative side monitoring line L12b. For example, in a case where a voltage of the battery cell 3 is small and a resistance value of a resistor R7 or a resistor R11 is small, the buffer B1 or the buffer B2 may not be provided. Thus, a cost of the assembled battery system 100 can be reduced further.

Moreover, in an assembled battery system 100 of a modification, for example, a diagnosis line including a diagnosis switch is provided between a diode D2 and, for example, a second common line L12 in the first negative side monitoring line L12a. Thus, at a time of a negative side failure diagnosis, it is possible to determine whether or not a resistor R6, the diode D2 and a resistor R10 have a failure.

In the foregoing embodiment, the charging inlet 10 is one example of an external circuit. However, the external circuit is not limited to the charging inlet 10. For example, the external circuit may be a circuit connected to the inverter 30, the motor generator or the like. The detector 43 may detect a short circuit of a relay that switches electrical connection between the as bled battery 1 and the circuit connected to the inverter 30, the motor generator or the like.

In the foregoing embodiment, the first diagnosis line Ld1 is connected to the second positive side monitoring line L11b. However, the first diagnosis line Ld1 may be connected between the diode D1 and the first monitoring IC 20a having the lower reference potential.

Moreover, instead of the diode D1 and the diode D2, a transistor, such as a metal-oxide-semiconductor field-effect-transistor (MOSFET) may be used.

In the foregoing embodiment, in the first charging inlet relay short circuit detection process, in the case where the voltage V1 of the first positive side monitoring line L11a is equal to or greater than the first predetermined voltage, or in a case there the voltage V2 of the second positive side monitoring line L11b is equal to or greater than the second predetermined voltage, the detector 43 determines that the first charging inlet relay Ry1 has a short circuit. However, in a case where i) the voltage V1 of the first positive side monitoring line L11a is equal to or greater than the first predetermined voltage, and ii) the voltage V2 of the second positive side monitoring line L11b is equal to or greater than the second predetermined voltage, the detector 43 may determine that the first charging inlet relay Ry1 has a short circuit. The same determination method may be used for the second charging inlet relay short circuit detection process, the positive side monitoring circuit failure diagnosis process and the negative side monitoring circuit failure diagnosis process.

More effects and modifications of the embodiment can be easily derived by a person skilled in the art Thus, broader aspects of the invention are not limited to the specific details and the representative embodiment described above. Therefore, various modifications are possible without departing from the comprehensive concept and spirit of the invention defined in the attached claims and equivalents thereof.

While the invention has been shown and described in detail, the foregoing description is in all aspects illustrative and not restrictive. It is therefore understood that, numerous other modifications and variations can be devised without departing from the scope of the invention.

What is claimed is:

1. An abnormality detection apparatus comprising:
   a relay that is provided between a power supply and an external circuit, both of which are in a high voltage system, the relay configured to switch an electrical connection state of the power supply to the external circuit between a closed state and an open state;
   a measurement circuit that measures a voltage of a circuit in the high voltage system, the measurement circuit being in the high voltage system and being connected between the relay and the external circuit; and
   a controller that determines whether the relay has a short circuit based on the voltage measured by the measurement circuit when the controller outputs a command signal to switch the relay to the open state, the controller being in a low voltage system having a lower voltage than a voltage of the high voltage system, wherein
   the circuit in the high voltage system branches into a plurality of circuits each of which has a corresponding measurement circuit;
   each of the corresponding measurement circuits is connected between the relay and the external circuit;
   the corresponding measurement circuits measure voltages of each of the plurality of circuits; and
   when the controller outputs the command signal to switch the relay to the open state, the controller determines whether the relay has the short circuit based on the voltages measured by the corresponding measurement circuits.

2. The abnormality detection apparatus according to claim 1, wherein
   the measurement circuit also is configured to monitor a voltage of the power supply.

3. The abnormality detection apparatus according to claim 2, wherein
   the corresponding measurement circuits are connected in series and monitor voltages of battery blocks that are connected in series, and
   the circuit in the high voltage system includes a circuit component that prevents a current from flowing from one of the corresponding measurement circuits having a higher reference potential to one of the corresponding measurement circuits having a lower reference potential.

4. The abnormality detection apparatus according to claim 3, wherein
   the voltage measured by the corresponding measurement circuit having the higher reference potential is adjusted based on the voltage measured by the corresponding measurement circuit having the lower reference potential.

5. The abnormality detection apparatus according to claim 2, wherein
the circuit in the high voltage system includes one or more resistors that restrict a voltage that is applied to the corresponding measurement circuits.

6. The abnormality detection apparatus according to claim 1, wherein
the relay includes: a first relay that is provided between a positive electrode of the power supply and the external circuit; and a second relay that is provided between a negative electrode of the power supply and the external circuit;
the circuit in the high voltage system includes: a first circuit that is connected between the first relay and the external circuit; and a second circuit that is connected between the second relay and the external circuit;
the measurement circuit measures a voltage of the first circuit and a voltage of the second circuit; and
the controller determines: (i) whether the first relay has the short circuit based on the voltage of the first circuit measured by the measurement circuit when the controller outputs the command signal to switch the first relay to the open state; and (ii) whether the second relay has the short circuit based on the voltage of the second circuit measured by the measurement circuit when the controller outputs the command signal to switch the second relay to the open state.

7. The abnormality detection apparatus according to claim 6, wherein
when the controller outputs the command signal to switch the second relay to the open state, the controller determines whether the second relay has the short circuit based on the voltage measured by the measurement circuit while the second circuit is being applied with a predetermined voltage.

8. The abnormality detection apparatus according to claim 1, wherein
the measurement circuit measures the voltage of the circuit while a predetermined voltage is being applied to the circuit having the relay switched to the open state in the high voltage system, and
the controller performs a failure diagnosis for the circuit in the high voltage system, based on the voltage measured by the measurement circuit while the predetermined voltage is being applied to the circuit in the high voltage system.

9. The abnormality detection apparatus according to claim 8, wherein
corresponding measurement circuits are connected in series, and monitor voltages of battery blocks connected in series;
the circuit in the high voltage system includes a circuit component that prevents a current from flowing from one of the corresponding measurement circuits having a higher reference potential to one of the corresponding measurement circuits having a lower reference potential; and
the predetermined voltage is applied between the circuit component and the corresponding measurement circuit having the lower reference potential.

10. An assembled battery system comprising:
an assembled battery that is comprised of battery blocks connected in series;
a relay that is provided between the assembled battery and an external circuit, both of which are in a high voltage system, the relay configured to switch an electrical connection state of the assembled battery to the external circuit between a closed state and an open state;
a measurement circuit that measures a voltage of a circuit in the high voltage system, the measurement circuit being in the high voltage system and being connected between the relay and the external circuit; and
a controller that determines whether the relay has a short circuit based on the voltage measured by the measurement circuit when the controller outputs a command signal to switch the relay to the open state, the controller being in a low voltage system having a lower voltage than a voltage of the high voltage system, wherein
the circuit in the high voltage system branches into a plurality of circuits each of which has a corresponding measurement circuit;
each of the corresponding measurement circuits is connected between the relay and the external circuit;
the corresponding measurement circuits measure voltages of each of the plurality of circuits; and
when the controller outputs the command signal to switch the relay to the open state, the controller determines whether the relay has the short circuit based on the voltages measured by the corresponding measurement circuits.

* * * * *